US012793641B2

(12) United States Patent
Kodama

(10) Patent No.: US 12,793,641 B2
(45) Date of Patent: Nov. 10, 2026

(54) ELECTRO-OPTICAL DEVICE AND ELECTRONIC INSTRUMENT

(71) Applicant: SEIKO EPSON CORPORATION, Tokyo (JP)

(72) Inventor: Takumi Kodama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/339,339

(22) Filed: Sep. 25, 2025

(65) Prior Publication Data

US 2026/0094572 A1 Apr. 2, 2026

(30) Foreign Application Priority Data

Sep. 27, 2024 (JP) ................................ 2024-169093

(51) Int. Cl.
*G09G 3/3233* (2016.01)

(52) U.S. Cl.
CPC ... *G09G 3/3233* (2013.01); *G09G 2300/0426* (2013.01); *G09G 2310/08* (2013.01)

(58) Field of Classification Search
CPC ......... G09G 3/3233; G09G 2300/0426; G09G 2310/08
See application file for complete search history.

(56) References Cited

U.S. PATENT DOCUMENTS

2012/0229438 A1* 9/2012 Fujita .................. G09G 3/3233 345/211
2016/0104413 A1 4/2016 Matsueda et al.
2017/0140706 A1* 5/2017 Song .................... G09G 3/3233
2018/0219050 A1 8/2018 Ota et al.
2021/0193053 A1* 6/2021 Ota .................... H10K 59/1315
2023/0247880 A1 8/2023 Kodama
2024/0172502 A1* 5/2024 Li .......................... H10D 86/00

FOREIGN PATENT DOCUMENTS

JP 2016075868 5/2016
JP 2018124540 8/2018
JP 2023112315 8/2023

* cited by examiner

*Primary Examiner* — Premal R Patel
(74) *Attorney, Agent, or Firm* — JCIPRNET

(57) ABSTRACT

An interconnect is provided between data lines in plan view so as to include a line Cen extending along a Y direction. The data lines are disposed symmetrically with respect to the interconnect, and anode interconnects up to a pixel electrode are disposed symmetrically with respect to the interconnect. A power supply voltage of a pixel circuit is applied to the interconnect.

6 Claims, 25 Drawing Sheets

<SECOND INTERCONNECT LAYER/FIRST INTERCONNECT LAYER>

<THIRD INTERCONNECT LAYER/SECOND INTERCONNECT LAYER>

<PIXEL ELECTRODE LAYER/THIRD INTERCONNECT LAYER>

<GATE ELECTRODE LAYER/SEMICONDUCTOR LAYER (COMPARATIVE EXAMPLE)>

<FIRST INTERCONNECT LAYER/GATE ELECTRODE LAYER
(COMPARATIVE EXAMPLE)>

<SECOND INTERCONNECT LAYER/FIRST INTERCONNECT LAYER (COMPARATIVE EXAMPLE)>

<THIRD INTERCONNECT LAYER/SECOND INTERCONNECT LAYER (COMPARATIVE EXAMPLE)>

<PIXEL ELECTRODE LAYER/THIRD INTERCONNECT LAYER
(COMPARATIVE EXAMPLE)>

ELECTRO-OPTICAL DEVICE AND ELECTRONIC INSTRUMENT

The present application is based on, and claims priority from JP Application Serial Number 2024-169093, filed Sep. 27, 2024, the disclosure of which is hereby incorporated by reference herein in its entirety.

BACKGROUND

1. Technical Field

The present disclosure relates to an electro-optical device and an electronic instrument.

2. Related Art

There has been known an electro-optical device using, for example, an organic light emitting diode (OLED) as a light emitting element. In the electro-optical device, a pixel circuit including a transistor for causing a current to flow through the light emitting element, or the like is provided corresponding to each pixel of an image to be displayed.

As the resolution and definition increase, an interval between adjacent pixel circuits and various interconnects is narrowed. When an interval between two interconnects is narrowed, a voltage change due to one interconnect is likely to affect the other interconnect, that is, interference is likely to occur.

Therefore, a technique has been proposed in which a power supply interconnect for supplying a current to a light emitting element is provided in an interconnect layer same as that for a scanning line so as to extend in a direction same as that of the scanning line to prevent interference in a direction orthogonal to the scanning line (for example, see JP-A-2018-124540).

JP-A-2018-124540 is an example of the related art.

In recent years, an electro-optical device has been required to have higher resolution and higher definition. In particular, there is a strong demand for narrowing a pitch in a horizontal direction parallel to the scanning line, but it is difficult to satisfy this demand while preventing the interference.

SUMMARY

An electro-optical device according to an aspect of the present disclosure includes: a first light emitting element including a first anode; a first data line configured to supply a first data signal to the first light emitting element; a second light emitting element including a second anode; a second data line configured to supply a second data signal to the second light emitting element; a first transistor circuit configured to control light emission of the first light emitting element; a second transistor circuit configured to control light emission of the second light emitting element; and a first shield interconnect. The first transistor circuit includes a first anode line electrically coupled to the first anode, the second transistor circuit includes a second anode line electrically coupled to the second anode, the first shield interconnect is disposed between the first data line and the second data line in plan view and extends along a first direction, the first data line and the second data line are symmetrical with respect to the first shield interconnect in plan view, and the first anode line and the second anode line are symmetrical with respect to the first shield interconnect in plan view.

DESCRIPTION OF EMBODIMENTS

Figure 1:
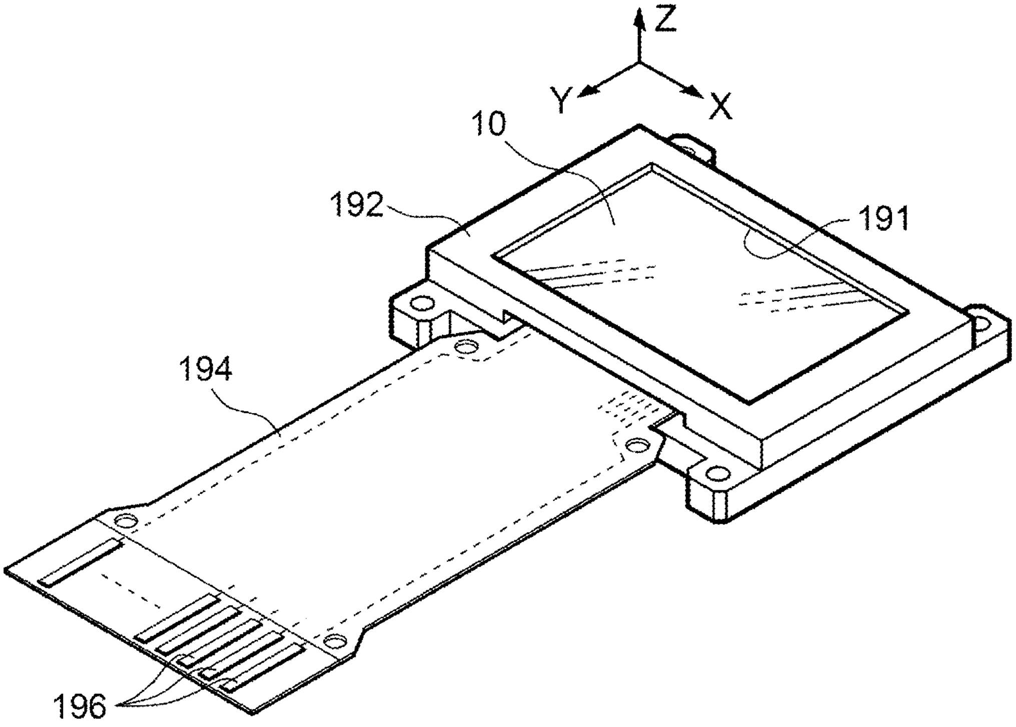
FIG. 1 is a perspective view illustrating an electro-optical device according to an embodiment.

Hereinafter, an electro-optical device according to an embodiment of the present disclosure will be described with reference to the drawings. Note that, in the drawings, dimensions and scales of the respective parts are appropriately made different from real ones. Further, the embodiment described below is a preferable specific example, and therefore various technically preferable limitations are imposed thereon, however, the scope of the present disclosure is not limited to the embodiment unless there is a description that the present disclosure is limited thereto in particular in the following description.

FIG. 1 is a perspective view illustrating an electro-optical device 10. The electro-optical device 10 is, for example, a micro display panel that displays an image in a head-mounted display or the like. The electro-optical device 10 includes a plurality of pixel circuits, drive circuits that drive the pixel circuits, and the like. The pixel circuits and the drive circuits are integrated on a semiconductor substrate. The semiconductor substrate is typically a silicon substrate, and may be another semiconductor substrate.

As illustrated in the drawing, the electro-optical device 10 is accommodated in a frame-shaped case 192 having an opening 191. One end of a flexible printed circuit (FPC) substrate 194 is coupled to the electro-optical device 10. A plurality of terminals 196 are provided at the other end of the FPC substrate 194. The plurality of terminals 196 are coupled to a host device (not illustrated). The host device supplies video data to the electro-optical device 10. The video data is data indicating a video to be displayed by the electro-optical device 10.

In the drawings, an X direction indicates a horizontal direction of a display image in the electro-optical device 10, and a Y direction indicates a vertical direction of the display image. A two-dimensional plane defined by the X direction and the Y direction is a substrate surface of the semiconductor substrate. A Z direction is perpendicular to the X direction and the Y direction and indicates an emission direction of light emitted from a light emitting element to be described later.

Figure 2:
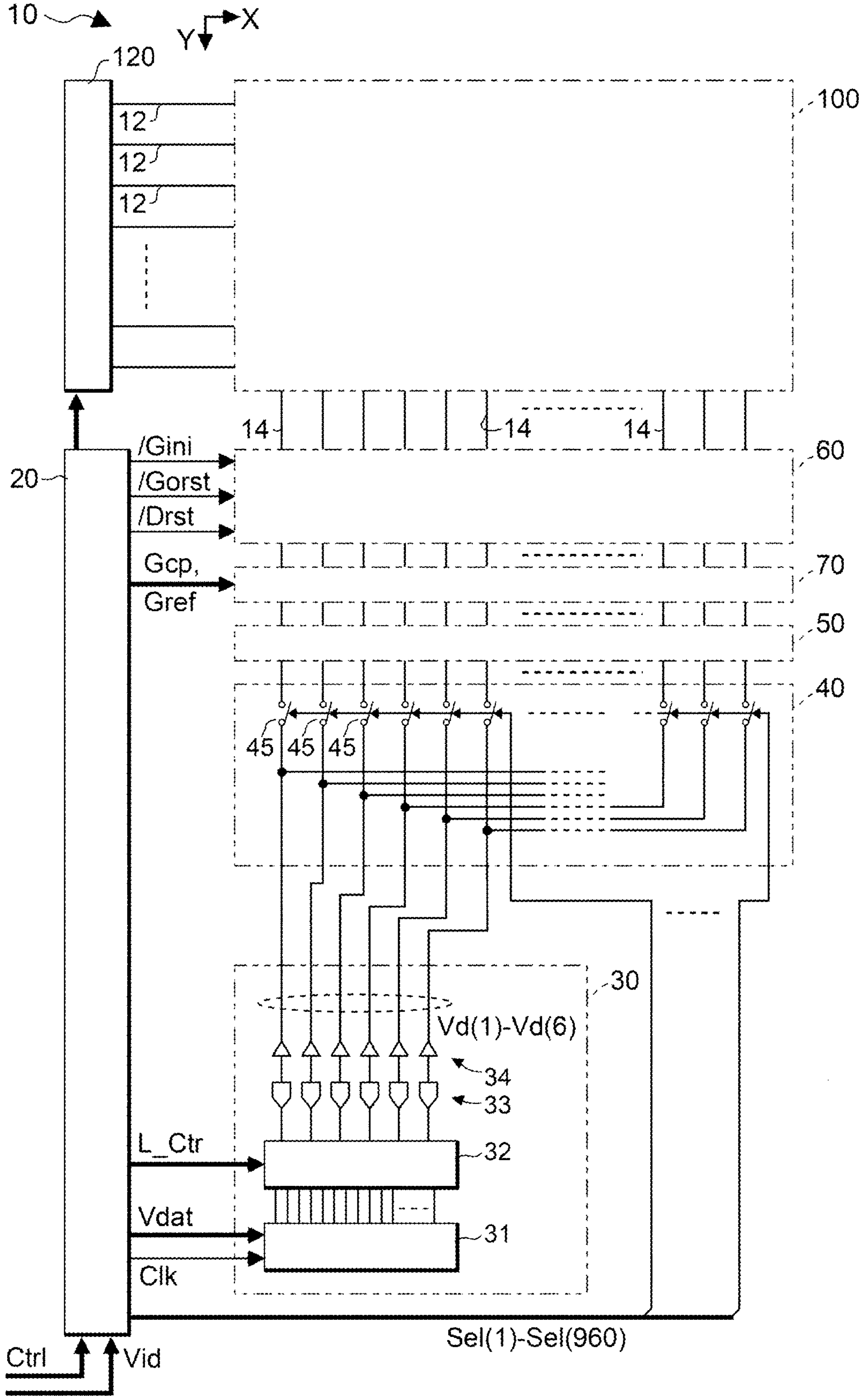
FIG. 2 is a block diagram illustrating a configuration of a main part of the electro-optical device.
Figure 3:
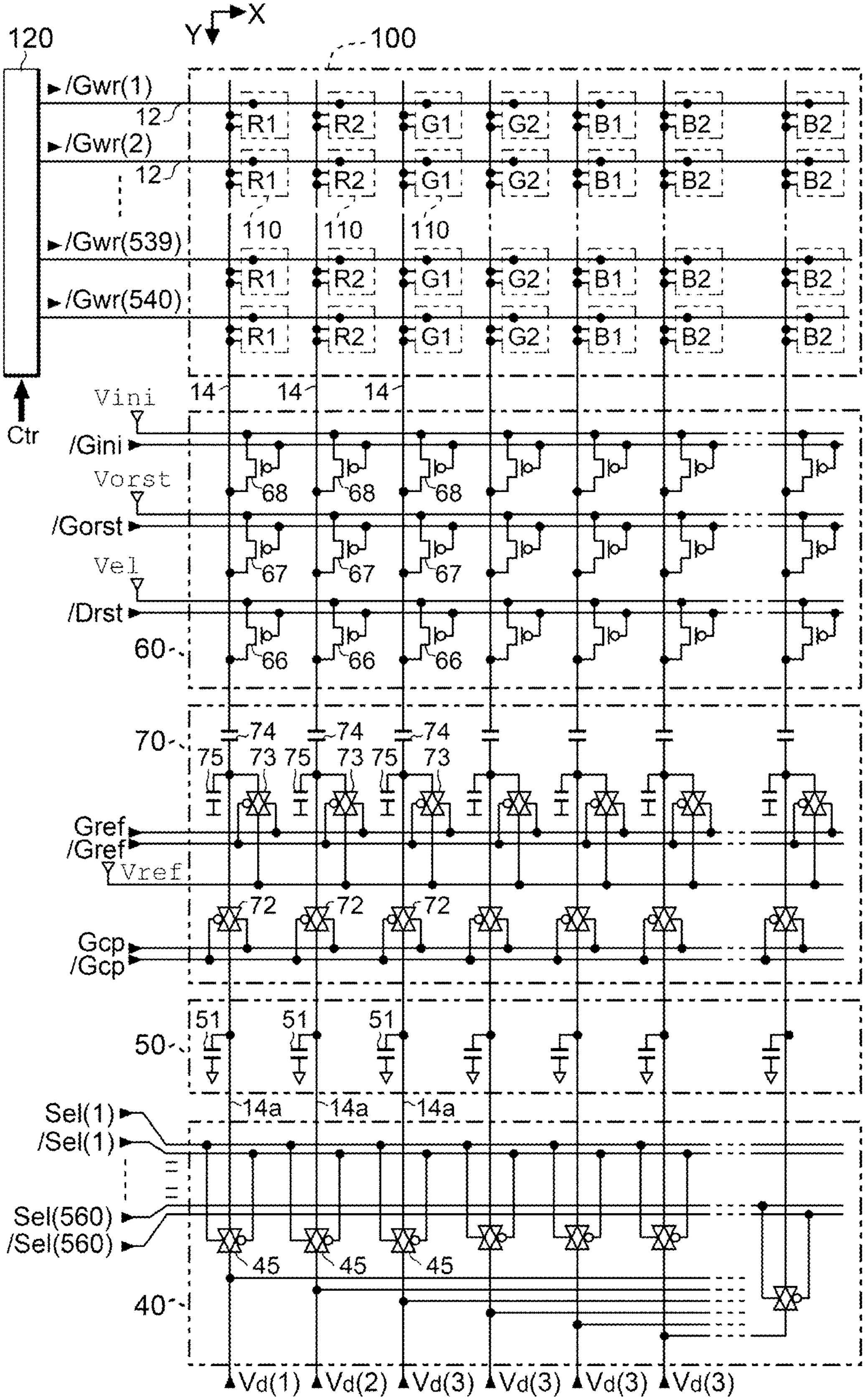
FIG. 3 is a circuit diagram illustrating a configuration of a main part of the electro-optical device.
Figure 4:
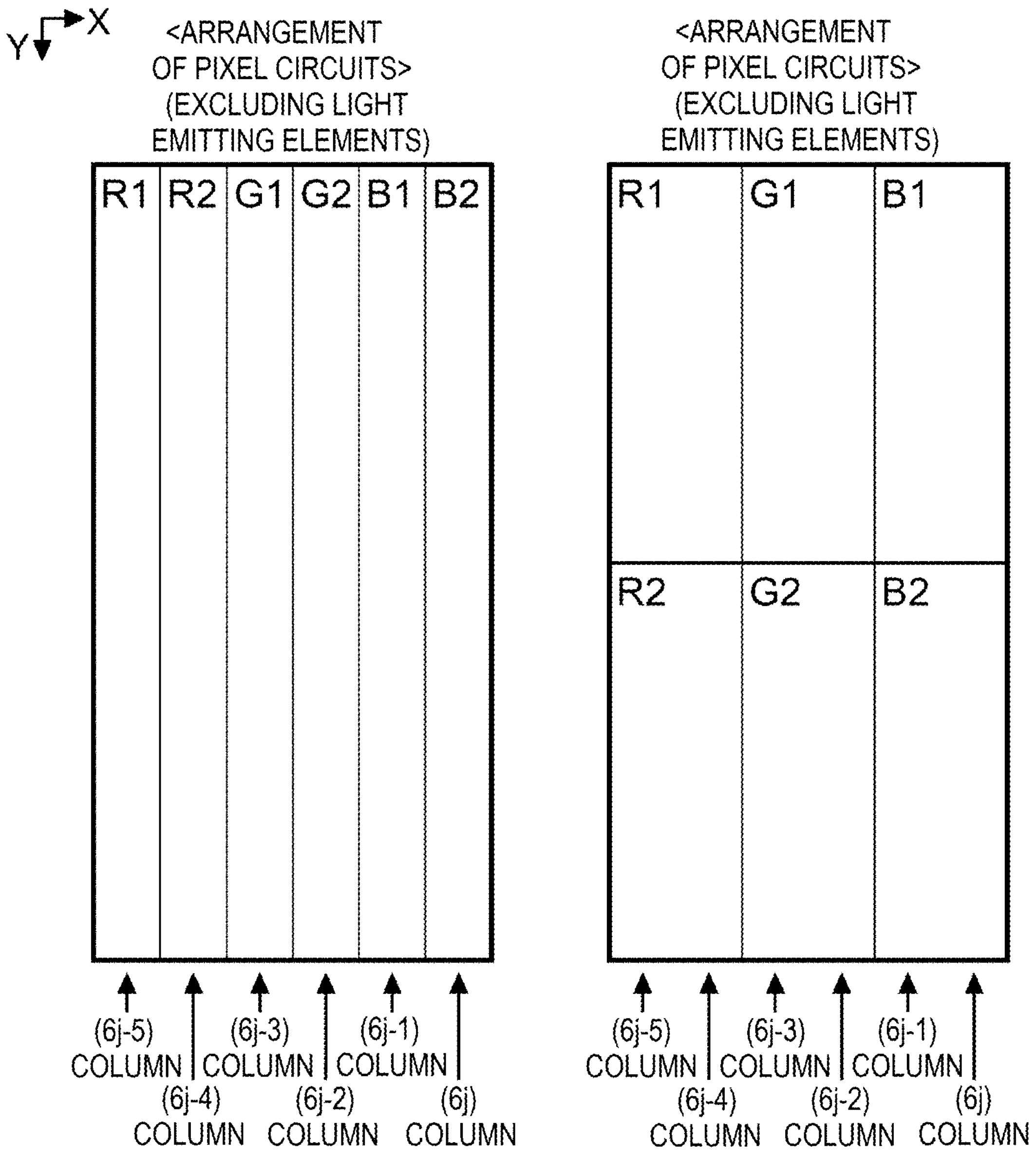
FIG. 4 is a plan view illustrating an arrangement of light emitting elements and the like in the electro-optical device.

FIG. 2 is a block diagram illustrating an electric configuration of the electro-optical device 10, and FIG. 3 is a diagram illustrating a configuration of a main part of the electro-optical device 10. FIG. 4 is a plan view illustrating an arrangement of pixel circuits excluding light emitting elements and an arrangement of light emitting elements in the electro-optical device 10.

As illustrated in FIG. 2, the electro-optical device 10 includes a control circuit 20, a data signal output circuit 30, a switch group 40, a capacitive element group 50, an initialization circuit 60, an auxiliary circuit 70, a display region 100, and a scanning line drive circuit 120.

In the electro-optical device 10, for example, 540 rows of scanning lines 12 are provided to extend in the X direction in the drawing, and 11,520 (=1920×3×2) columns of data lines 14 are provided to extend in the Y direction and are provided to be electrically insulated from the scanning lines 12.

In order to distinguish rows in the scanning line 12, the rows are called rows 1, 2, 3, . . . , 539, and 540 in order from the top in the drawing. In order to generally describe the scanning line 12 without specifying a row, a notation "i-th row" is used, where i is an integer of 1 or more and 540 or less.

In order to distinguish columns in the data line 14, the columns are called columns 1, 2, 3, . . . , 11, 520 in order from the left in the drawing. The data lines 14 are grouped every six columns. When an integer j of 1 or more and 960 or less is used in order to generalize and describe the groups, a j-th group from the left contains a total of six columns of the data lines 14, that is, the data lines 14 in a (6j-5)-th column, a (6j-4)-th column, a (6j-3)-th column, a (6j-2)-th column, a (6j-1)-th column, and a (6j)-th column.

In the embodiment, a pixel circuit 110R includes a light emitting element that emits light containing a red component, a pixel circuit 110G includes a light emitting element that emits light containing a green component, and a pixel circuit 110B includes a light emitting element that emits light containing a blue component.

When the pixel circuits 110R, 110G, and 110B are generally described without specifying a color, the pixel circuits are simply denoted by a reference numeral 110.

The pixel circuits 110 excluding the light emitting elements are provided corresponding to the scanning lines 12 arranged in 540 rows and the data lines 14 arranged in 11,520 columns. In terms of intersections between the scanning line 12 in the i-th row and the data lines 14 in the (6j-5)-th to (6j)-th column, as illustrated in the left column in FIG. 4, six pixel circuits 110R, 110R, 110G, 110G, 110B, and 110B are arranged in one row and six columns in order along the X direction. Note that in the drawing, for the sake of simplicity and distinction, the pixel circuits 110R, 110R, 110G, 110G, 110B, and 110B excluding the light emitting elements are denoted as R1, R2, G1, G2, B1, and B2, respectively.

Note that a region where the pixel circuits 110 are arranged is a display region 100.

In the drawing, the pixel circuits 110 excluding the light emitting elements are arranged in one row and six columns, whereas the light emitting elements are arranged in two rows and three columns as illustrated in the right column in FIG. 4. Therefore, the size of the pixel circuits 110 excluding the light emitting elements in the X direction is ½ times the size of the light emitting elements in the X direction, and the size of the pixel circuits 110 excluding the light emitting element in the Y direction is twice the size of the light emitting elements in the Y direction.

The pixel circuits 110 excluding the light emitting elements are arranged in a matrix of 540 rows×11,520 columns, and the light emitting elements are arranged in a matrix of vertical 1,080 rows×horizontal 5,760 columns. Three light emitting elements adjacent to each other in the X direction in plan view correspond to the red pixel circuit 110R, the green pixel circuit 110G, and the blue pixel circuit 110B in order and a color of one dot is expressed by additive color mixing of these three colors.

Therefore, in the embodiment, an image in which color dots are arranged in a matrix of vertical 1,080 rows× horizontal 1,920 columns is displayed.

Note that the pixel circuits 110R, 110G, and 110B represent a red component, a green component, and a blue component of one color pixel in order, and thus should be referred to as sub-pixel circuits in a strict sense, but will be referred to as the pixel circuit in the present description for convenience.

In FIG. 2, the control circuit 20 controls each unit based on video data Vid and a control signal Ctrl supplied from the host device.

The video data Vid is supplied in synchronization with a synchronization signal, and designates a grayscale level of a pixel in an image to be displayed by the electro-optical device 10 by 8 bits for RGB, for example. The synchronization signal includes a vertical synchronization signal instructing a start of vertical scanning of the video data Vid, a horizontal synchronization signal instructing a start of horizontal scanning, and a dot clock signal indicating a timing of one pixel of the video data Vid.

In order to control each unit, the control circuit 20 generates, as logic signals, control signals Gref, Gcp, /Drst, /Gorst, /Gini, L_Ctr, and Sel(1) to Sel(960) and a clock signal Clk. The control circuit 20 controls the scanning line drive circuit 120 based on the vertical synchronization signal included in the control signal Ctrl.

Although omitted in FIG. 2, the control circuit 20 outputs a control signal /Gcp having a logical inversion relationship with the control signal Gcp, a control signal /Gref having a logical inversion relationship with the control signal Gref, and control signals /Sel(1) to/Sel(960) having a logical inversion relationship with the Sel(1) to Sel(960).

In these logic signals, an L level is 0 V which is a reference of a voltage zero, and an H level is, for example, 6.0 V. Control signals /Gel(1) to/Gel(540) to be described later take three levels: L level, H level and M level. The M level is an intermediate level between the L level and the H level, and is, for example, 4 V to 5 V.

The scanning line drive circuit 120 is a circuit for driving the pixel circuits 110 arranged in a matrix in units of one row, and outputs, in addition to a scanning signal, various control signals synchronized with the scanning signal, which are omitted in FIG. 3.

The data signal output circuit 30 outputs a data signal toward the data line 14. Specifically, the data signal output circuit 30 outputs a data signal having a voltage according to the grayscale level of each pixel.

In the embodiment, a voltage amplitude of the data signal output from the data signal output circuit 30 is compressed and supplied to the data line 14. Therefore, the compressed data signal also has a voltage according to the grayscale level of the pixel.

The data signal output circuit 30 also has a function of parallel-converting serially supplied video data Vdat into a plurality of phases (in this example, "6" phases corresponding to the number of columns of the data lines 14 forming the group) and outputting the converted data. For the sake of simplicity, the following description will be given as "6" phase.

The data signal output circuit 30 includes a shift register 31, a latch circuit 32, a D/A conversion circuit group 33, and an amplifier group 34.

The shift register 31 sequentially transfers the serially supplied video data Vdat in synchronization with the clock signal Clk, and stores the video data for one row, that is, 11, 520 pixel circuits 110. In the embodiment, the shift register 31 sequentially stores the video data Vdat in units of six phases (in units of six pixels) in order to parallel-convert the video data Vdat into six phases and output the converted data.

The latch circuit 32 latches the video data Vdat stored in the shift register 31 in units of six phases in accordance with the control signal L_Ctr, parallel-converts the latched video data Vdat into six phases in accordance with the control signal L_Ctr, and outputs the converted data.

The D/A conversion circuit group 33 includes six digital to analog (D/A) converters. The six D/A converters convert the six-phase video data Vdat output from the latch circuit 32 into analog signals.

The amplifier group 34 includes six amplifiers. Six-phase analog signals output from the D/A conversion circuit group 33 are amplified by the six amplifiers and output as data signals Vd(1) to Vd(6).

Note that the D/A conversion circuit may be configured, for example, such that a switch and a capacitive element may be provided corresponding to each bit, and charging and discharging of the capacitive element may be controlled by the switch according to "0" or "1" of each bit. Depending on a configuration of the data signal output circuit 30, the amplifier group 34 does not necessarily have to be provided. For example, when the D/A conversion circuit is configured such that the switch and the capacitive element are provided corresponding to each bit and the charging and discharging of the capacitive element is controlled by the switch according to each bit, the amplifier group 34 may not be provided.

The control circuit 20 outputs the control signals Sel(1) to Sel(960) that are sequentially and exclusively set at the H level during a compensation period preceding a write period, as will be described later.

In FIG. 3, the scanning line drive circuit 120 supplies scanning signals /Gwr(1), /Gwr(2), . . . , /Gwr(539), /Gwr (540) to the scanning lines 12 in the 1st, 2nd, 3rd, . . . 539-th, and 540-th rows in this order.

In the electro-optical device 10, data transfer lines 14*a* are provided in one-to-one correspondence with the data lines 14.

The switch group 40 is a collection of transmission gates 45 provided for each data transfer line 14*a*.

Input terminals of the 1,920 transmission gates 45 corresponding to the data transfer lines 14*a* in the first, seventh, . . . , 11515-th, that is, (6j-5)-th columns are commonly coupled. The data signal Vd(1) is supplied to the input terminal in time series for each pixel.

Similarly, input terminals of the 1,920 transmission gates 45 corresponding to the data transfer lines 14*a* in the second, eighth, . . . , 11516-th, that is, (6j-4)-th columns are commonly coupled, and the data signal Vd(2) is supplied in time series for each pixel. Similarly, input terminals of the 1920 transmission gates 45 corresponding to the data transfer lines 14*a* in (6j-3)-th, (6j-2)-th, (6j-1)-th, and (6j)-th columns are commonly coupled, and the data signals Vd(3), Vd(4), Vd(5), and Vd(6) are sequentially supplied in time series for each pixel.

An output terminal of the transmission gate 45 in a certain column is coupled to one end of the data transfer line 14*a* in that column.

The six transmission gates 45 corresponding to columns (6j-5) to (6j) belonging to the j-th group are turned on between the input terminal and the output terminal when a control signal Sel(j) is at the H level (when the control signal /Sel(j) is at the L level).

In FIG. 3, only a part of the first group and the 960-th group is illustrated and other groups are omitted due to a space limitation. The transmission gate 45 in FIG. 3 is simply represented as a switch in FIG. 2.

In the present description, the "on state" of the switch, the transistor, or the transmission gate means that both ends of the switch, a source node and a drain node of the transistor, and both ends of the transmission gate are electrically coupled to each other to be in a low impedance state. The "off state" of the switch, the transistor, or the transmission gate means that both ends of the switch, the source node and the drain node of the transistor, or both ends of the transmission gate are not electrically coupled to be in a high impedance state.

In the present description, the "electrically coupled" or simply "coupled" means a direct or indirect connection or coupling between two or more elements.

The capacitive element group 50 is a collection of capacitive elements 51 provided for each data transfer line 14*a*. Here, one end of the capacitive element 51 corresponding to the data transfer line 14*a* in a certain column is coupled to one end of the data transfer line 14*a* in that column, and the other end of the capacitive element 51 is grounded to a constant potential, for example, a potential serving as a reference of a voltage zero.

The auxiliary circuit 70 is a collection of transmission gates 72 and 73 provided for each column, and capacitive elements 74 and 75 provided for each column.

Here, the transmission gate 72 corresponding to a certain column is turned on between the input terminal and the output terminal when the control signal Gcp is at the H level (when the control signal /Gcp is at the L level). An input terminal of the transmission gate 72 corresponding to a certain column is coupled to the other end of the data transfer line 14*a* in that column, and an output terminal of the transmission gate 72 corresponding to that column is coupled to an output terminal of the transmission gate 73 corresponding to that column, one end of the capacitive element 74 corresponding to that column, and one end of the capacitive element 75 corresponding to that column.

The transmission gate 73 corresponding to a certain column is turned on between the input terminal and the output terminal when the control signal Gref is at the H level (when the control signal /Gref is at the L level). A voltage Vref is applied to the input terminal of the transmission gate 73 corresponding to a certain column.

The other end of the capacitive element 75 corresponding to a certain column is grounded to a constant potential, for example, a potential serving as a reference of a voltage zero.

The other end of the capacitive element 74 corresponding to a certain column is coupled to one end of the data line 14 corresponding to that column.

The initialization circuit 60 is a collection of P-channel MOS type transistors 66 and 68 and an N-channel MOS type transistor 67 provided for each data line 14.

The control signal /Drst is supplied to a gate electrode of the transistor 66 corresponding to the data line 14 in a certain column, a voltage Vel is applied to a source node of the transistor 66, and a drain node of the transistor 66 is coupled to the data line 14 in that column.

The control signal /Gorst is supplied to a gate electrode of the transistor 67 corresponding to the data line 14 in a certain column, a voltage Vorst is applied to a source node of the transistor 67, and a drain node of the transistor 67 is coupled to the data line 14 in that column.

The control signal /Gini is supplied to a gate electrode of the transistor 68 corresponding to the data line 14 in a certain column, a voltage *Vini* is applied to a source node of the transistor 68, and a drain node of the transistor 68 is coupled to the data line 14 in that column.

Figure 5:
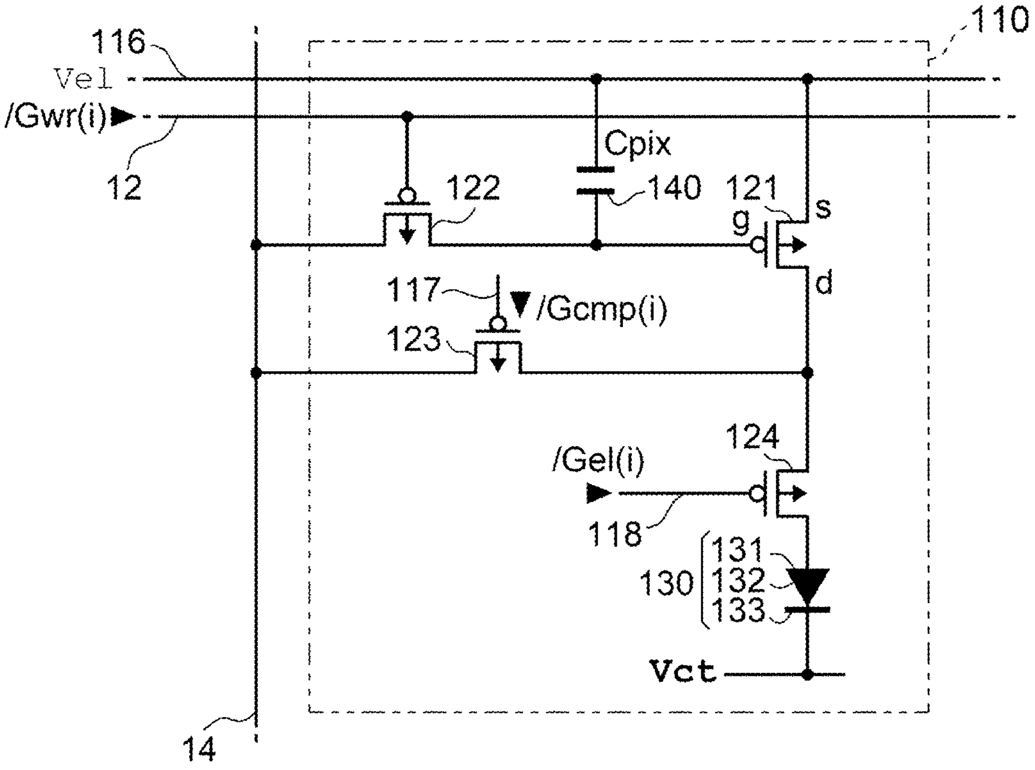
FIG. 5 is a diagram illustrating a configuration of a pixel circuit in a display region.

FIG. 5 is a diagram illustrating a configuration of the pixel circuit 110. The pixel circuits 110R, 110G, and 110B are electrically identical in configuration to one another. Therefore, the pixel circuits 110 will be described by using the pixel circuit 110 corresponding to the i-th row and the (6j-5)-th column as a representative.

As illustrated in the drawing, the pixel circuit 110 includes P-channel MOS type transistors 121 to 124, an OLED 130, and a capacitive element 140.

In addition to a scanning signal /Gwr(i), control signals /Gcmp (i) and/Gel(i) are supplied to the pixel circuits 110 in the i-th row from the scanning line drive circuit 120.

The OLED 130 is an example of the light emitting element, and includes a pixel electrode 131, a common electrode 133 and a light emitting layer 132 sandwiched between the pixel electrode 131 and the common electrode 133. The pixel electrode 131 functions as an anode, and the common electrode 133 functions as a cathode. The pixel electrode 131 has light reflectivity, and the common electrode 133 has light reflectivity and light transmissivity. In the OLED 130, when a current flows from the anode to the cathode, holes injected from the anode and electrons injected from the cathode are recombined in the light emitting layer 132 to generate excitons, thereby generating white light.

In the case of color display as in the embodiment, the generated white light resonates in, for example, an optical resonator (not illustrated) including a reflective layer and a semi-reflective and semi-transmissive layer, and is emitted at a resonance wavelength set corresponding to any one of colors of red (R), green (G), and blue (B). A color filter corresponding to the color is provided on a light emission side of the optical resonator as described later. Therefore, light emitted from the OLED 130 is visually recognized by an observer through coloring by the optical resonator and the color filter.

When the electro-optical device 10 simply displays a monochrome image of only light and dark, the color filter is omitted.

In the transistor 121 of the pixel circuit 110 in the i-th row and (6j-5)-th column, a gate electrode g is coupled to a drain node of the transistor 122 and one end of the capacitive element 140, a source node s is coupled to an interconnect 116 of the voltage Vel, and a drain node d is coupled to a source node of the transistor 123 and a source node of the transistor 124.

The other end of the capacitive element 140 is coupled to the interconnect 116 of a constant voltage, for example, the voltage Vel. Therefore, the capacitive element 140 holds a voltage between the gate electrode g and the source node s in the transistor 121.

Note that the capacitive element 140 may be formed by sandwiching an insulating film between electrodes in different interconnect layers on a semiconductor substrate as described later, or may use a parasitic capacitance in the gate electrode g of the transistor 121.

In the transistor 122 of the pixel circuit 110 in the i-th row and (6j-5)-th column, a gate electrode is coupled to the scanning line 12 in the i-th row, and a source node is coupled to the data line 14 in the (6j-5)-th column.

In the transistor 123 of the pixel circuit 110 in the i-th row and (6j-5)-th column, the control signal /Gcmp (i) is supplied to a gate electrode, and a drain node is coupled to the data line 14 in the (6j-5)-th column. The control signal /Gcmp (i) is supplied from the scanning line drive circuit 120 via a control line 117 in the i-th row.

In the transistor 124 of the pixel circuit 110 in the i-th row and (6j-5)-th column, the control signal /Gel (i) is supplied to a gate electrode, and a drain node is coupled to the pixel electrode 131 which is an anode of the OLED 130. Note that the control signal /Gel(i) is supplied from the scanning line drive circuit 120 via a control line 118 in the i-th row.

The common electrode 133 functioning as a cathode of the OLED 130 is coupled to a power supply line of a voltage Vct. Since the electro-optical device 10 is formed on the semiconductor substrate, a substrate potential of the P-channel type transistors 121 to 124 is, for example, the voltage Vel.

Figure 6:
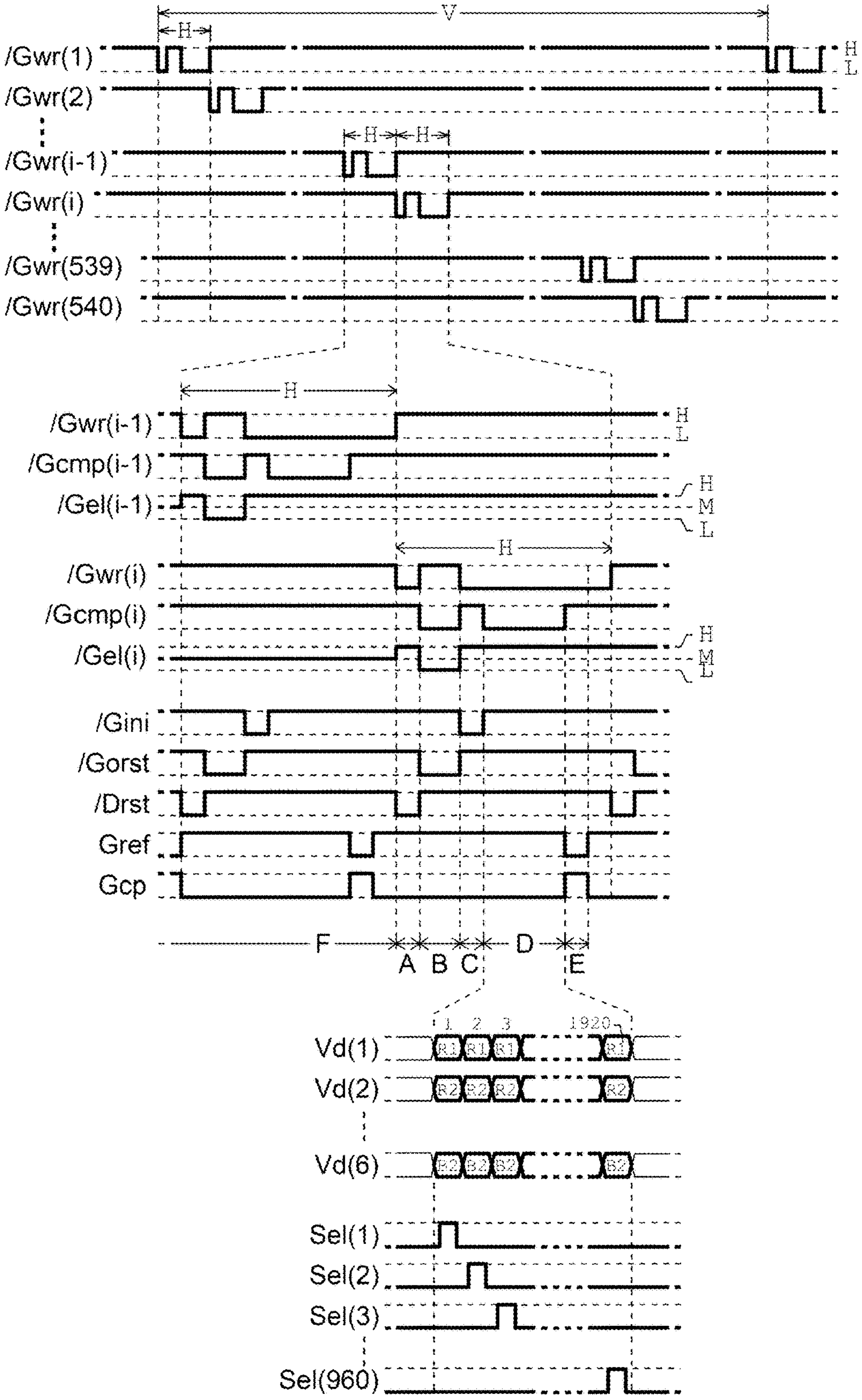
FIG. 6 is a timing chart illustrating an operation of the electro-optical device.
Figure 7:
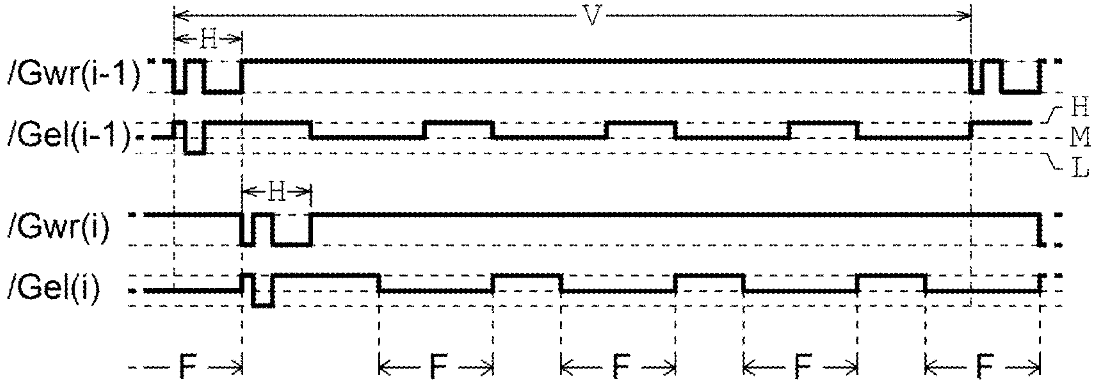
FIG. 7 is a timing chart illustrating an operation of the electro-optical device.

FIG. 6 is a timing chart illustrating an operation of the electro-optical device 10, and FIG. 7 is a diagram illustrating an example of a relationship between the scanning signal and the control signal for light emission.

In the electro-optical device 10, the first, second, third, . . . , m-th rows are horizontally scanned in order in a period of one frame (V).

In the present description, the period of one frame (V) refers to a period required to display one frame of an image designated by the video data Vid. If the length of the period of one frame is the same as the vertical synchronization period, for example, when a frequency of the vertical synchronization signal included in a synchronization signal Sync is 60 Hz, a length of the period of one frame is 16.7 milliseconds corresponding to one cycle of the vertical synchronization signal. A period required for horizontal scanning of one row is a horizontal scanning period (H). In FIGS. 5 and 6, a vertical scale indicating a voltage is not always uniform for each signal.

An operation in the horizontal scanning period (H) in each row is almost the same in the pixel circuits 110. Operations of the pixel circuits 110 in the 1st to 11520-th columns in a row scanned in a certain horizontal scanning period (H) are also almost the same. Therefore, the following description focuses on the pixel circuit 110 in the i-th row and (6j-5)-th column.

In the electro-optical device 10, the horizontal scanning period (H) is divided into five periods of initialization periods (A), (B), and (C), a compensation period (D), and a write period (E) in order of time. As the operation of the pixel circuit 110, a light emission period (F) is further added to the five periods. The light emission period (F) in the i-th row is a period in which the control signal /Gel(i) is at the M level in FIG. 7.

Among the initialization periods (A), (B), and (C), the initialization period (A) is a period for setting the transistor 121 to an off state, and is a period for preliminary preparation processing of the initialization period (C). The initialization period (B) is a period for resetting a potential at the anode of the OLED 130, and the initialization period (C) is a period for applying, to the gate electrode g of the transistor 121, a voltage for turning on the transistor 121 at the start of the compensation period (D).

In the initialization period (A) in the horizontal scanning period (H), the control signal /Gini is at the H level, the control signal /Gorst is at the H level, the control signal /Drst is at the L level, the control signal Gref is at the H level, and the control signal Gcp is at the L level. Therefore, the transistor 68 is turned off, the transistor 67 is turned off, the transistor 66 is turned on, the transmission gate 73 is turned on, and the transmission gate 72 is turned off.

In the initialization period (A) of the horizontal scanning period (H) in which the i-th row is selected, the scanning signal /Gwr(i) is at the L level, the control signal /Gcmp (i) is at the H level, and the control signal /Gel(i) is at the H level. Therefore, in the pixel circuit 110, the transistor 122 is turned on, and the transistors 123 and 124 are turned off.

Figure 8:
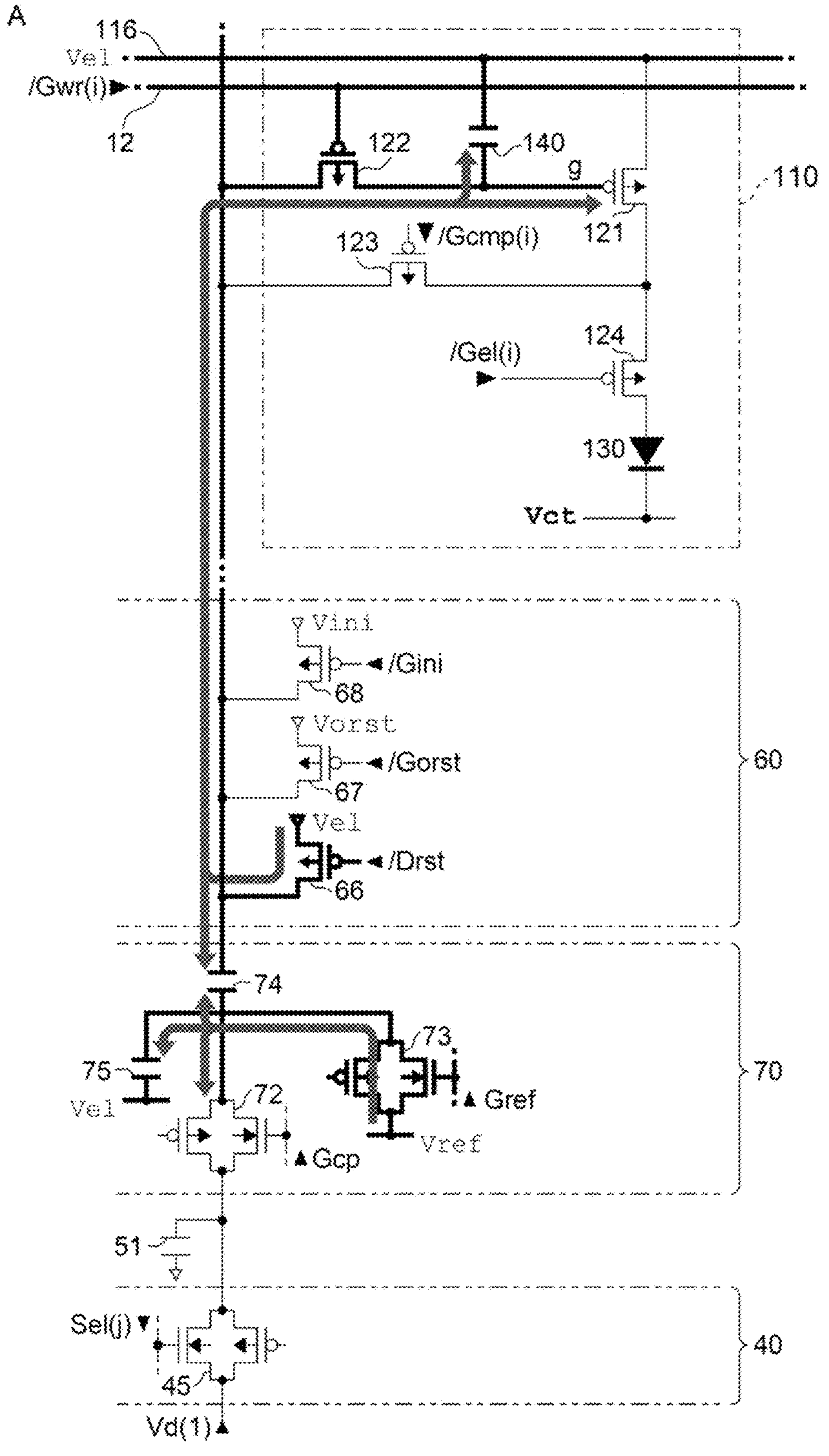
FIG. 8 is a diagram illustrating an operation of the electro-optical device.

Therefore, in the initialization period (A), as illustrated in FIG. 8, the voltage Vref is applied to one end of the capacitive element 74, one end of the capacitive element 75, and the output terminal of the transmission gate 72 via the transmission gate 73. In the pixel circuit 110, the voltage Vel is applied to one end of the capacitive element 140 and the gate electrode g of the transistor 121 via the transistor 66, the data line 14, and the transistor 122 in order. When the voltage Vel is applied to the gate electrode g, a voltage between the gate electrode g and the source node s becomes zero, and thus the transistor 121 is forcibly in the off state, and a current flowing through the OLED 130 is cut off. The voltage Vel is applied to the other end of the capacitive element 74 via the data line 14, and thus the capacitive element 74 is charged to a voltage |Vel−Vref|.

In the initialization period (B) in the horizontal scanning period (H), the control signal /Gini is at the H level, the control signal /Gorst is at the L level, the control signal /Drst is at the H level, the control signal Gref is at the H level, and the control signal Gcp is at the L level. Therefore, the transistor 68 is kept off, the transistor 67 is turned on, the transistor 66 is turned off, the transmission gate 73 is kept on, and the transmission gate 72 is kept off.

In the initialization period (B) of the horizontal scanning period (H) in which the i-th row is selected, the scanning signal /Gwr(i) is at the H level, the control signal /Gcmp (i) is at the L level, and the control signal /Gel(i) is at the L level. Therefore, in the pixel circuit 110, the transistor 122 is turned off, and the transistors 123 and 124 are turned on.

Figure 9:
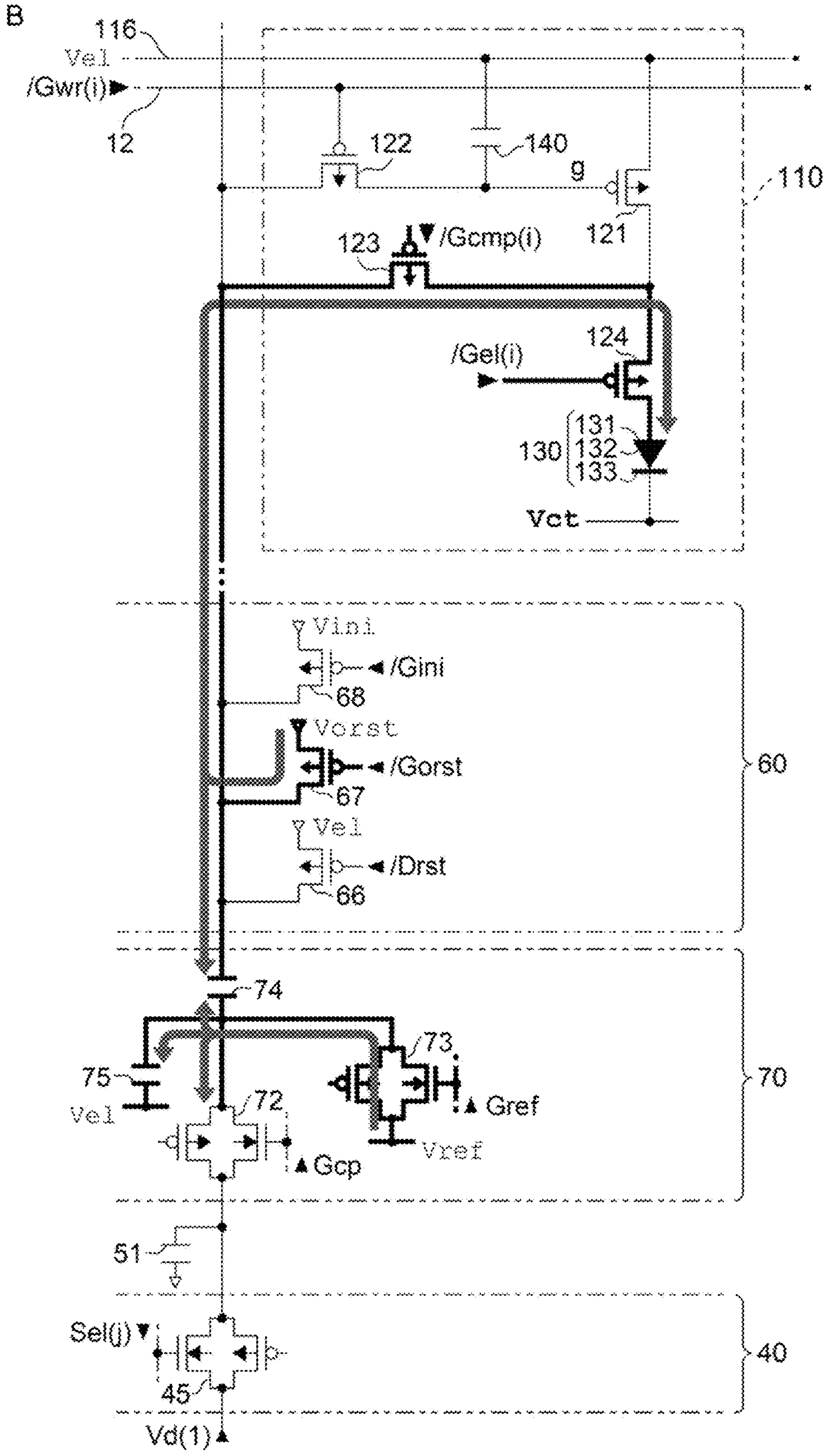
FIG. 9 is a diagram illustrating an operation of the electro-optical device.

Therefore, in the initialization period (B), as illustrated in FIG. 9, one end of the capacitive element 74, one end of the capacitive element 75, and the output terminal of the transmission gate 72 are maintained at the voltage Vref. In the pixel circuit 110, the voltage Vorst is applied to the pixel electrode 131, which is the anode of the OLED 130, via the transistor 67, the data line 14, and the transistors 123 and 124 in order. In the OLED 130, the light emitting layer 132 is sandwiched between the pixel electrode 131 and the common electrode 133, and thus a capacitance component is parasitic. In the initialization period (B), by applying the voltage Vorst to the pixel electrode 131, a voltage retained in the capacitance component, specifically, a voltage according to the current flowing through the OLED 130 in the light emission period (F) is reset. Note that the voltage Vorst is a voltage that causes the OLED 130 to emit no light, and specifically, is a zero volt corresponding to the L level or a voltage (0 to 1 volts) close to the zero volt. The voltage Vorst is applied to the other end of the capacitive element 74 via the data line 14, and thus the capacitive element 74 is charged to a voltage | Vorst−Vref|.

In the initialization period (C) in the horizontal scanning period (H), the control signal /Gini is at the L level, the control signal /Gorst is at the H level, the control signal /Drst is at the H level, the control signal Gref is at the H level, and the control signal Gcp is at the L level. Therefore, the transistor 68 is turned on, the transistor 67 is turned off, the transistor 66 is kept off, the transmission gate 73 is kept on, and the transmission gate 72 is kept off.

In the initialization period (C) of the horizontal scanning period (H) in which the i-th row is selected, the scanning signal /Gwr(i) is at the L level, the control signal /Gcmp (i) is at the H level, and the control signal /Gel(i) is at the H level. Therefore, in the pixel circuit 110, the transistor 122 is turned on, and the transistors 123 and 124 are turned off.

Figure 10:
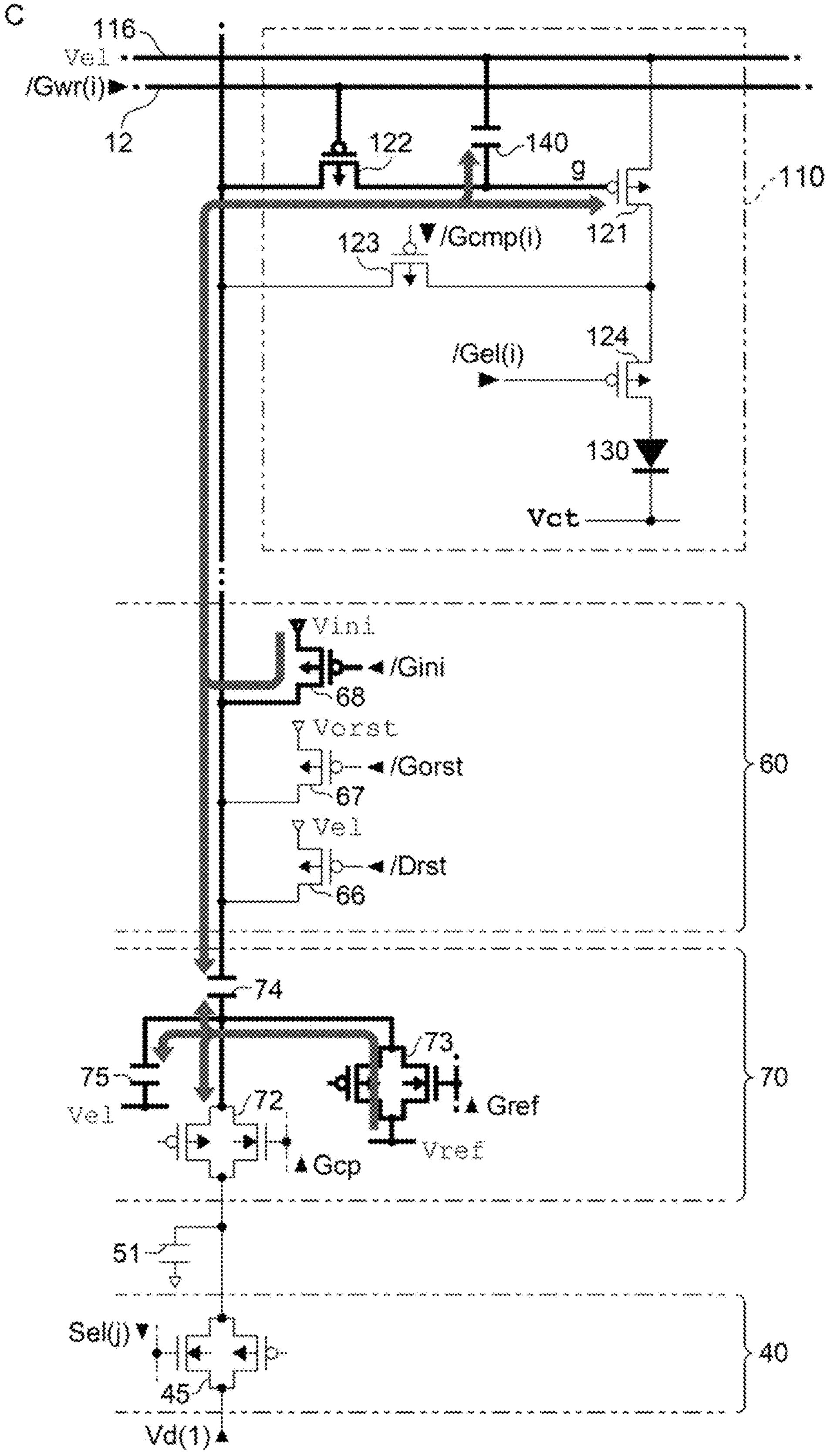
FIG. 10 is a diagram illustrating an operation of the electro-optical device.

Therefore, in the initialization period (C), as illustrated in FIG. 10, one end of the capacitive element 74, one end of the capacitive element 75, and the output terminal of the transmission gate 72 are maintained at the voltage Vref. In the pixel circuit 110, the voltage Vini is applied to one end of the capacitive element 140 and the gate electrode g of the transistor 121 via the transistor 68, the data line 14, and the transistor 122 in order. The voltage Vini is applied to the other end of the capacitive element 74 via the data line 14, and thus the capacitive element 74 is charged to a voltage |Vini−Vref|.

In the compensation period (D) in the horizontal scanning period (H), the control signal /Gini is at the H level, the control signal /Gorst is at the H level, the control signal /Drst is at the H level, the control signal Gref is at the H level, and the control signal Gcp is at the L level. Therefore, the transistor 68 is turned off, the transistor 67 is kept off, the transistor 66 is kept off, the transmission gate 73 is kept on, and the transmission gate 72 is kept off.

In the compensation period (D) of the horizontal scanning period (H) in which the i-th row is selected, the scanning signal /Gwr(i) maintains at the L level, the control signal /Gcmp (i) changes to the L level, and the control signal /Gel(i) maintains at the H level. Therefore, in the pixel circuit 110, the transistor 122 is kept on, the transistor 123 is turned on, and the transistor 124 is turned off.

Figure 11:
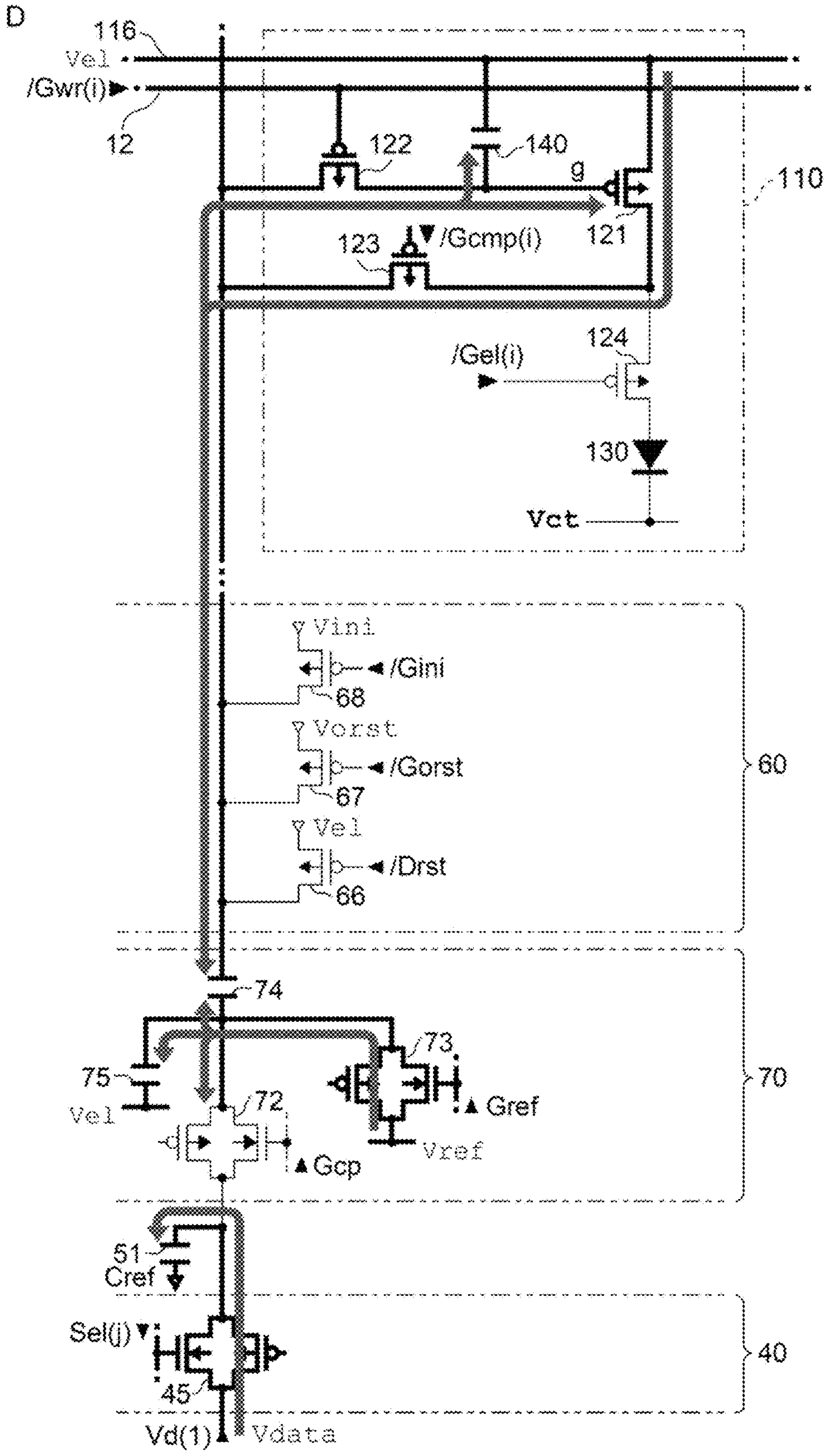
FIG. 11 is a diagram illustrating an operation of the electro-optical device.

Therefore, in the compensation period (D), as illustrated in FIG. 11, one end of the capacitive element 74, one end of the capacitive element 75, and the output terminal of the transmission gate 72 are maintained at the voltage Vref.

In the pixel circuit 110, one end of the capacitive element 140 is retained at the voltage Vini in the immediately preceding initialization period (C), (Vel-Vini) is retained as a voltage between the gate electrode g and the source node s of the transistor 121.

In this state, when the transistor 123 is turned on, the transistor 121 is in a state in which the gate electrode and the drain node are coupled, that is, a diode-coupled state. Therefore, in the transistor 121, a voltage Vgs between the gate electrode g and the source node s converges to approach a threshold voltage of the transistor 121. Here, when the threshold voltage is represented as Vth for convenience, the gate electrode g of the transistor 121 converges to approach a voltage (Vel-Vth) corresponding to the threshold voltage Vth.

Note that at the start of the compensation period (D), it is necessary that a current flows from the source node to the drain node in the diode-coupled transistor 121. Therefore, the voltage Vini applied to the gate electrode g in the initialization period (C) before the compensation period (D) has a relationship $$Vini < Vel - Vth.$$

In the compensation period (D), the gate electrode g of the transistor 121 is coupled to the data line 14 via the transistor 122, and the drain node d of the transistor 121 is coupled to the data line 14 via the transistor 123. Therefore, the data line 14 and the other end of the capacitive element 74 also converge to approach the voltage (Vel-Vth). Therefore, the capacitive element 74 is charged to substantially a voltage |Vel−Vth−Vref|.

On the other hand, in the compensation period (D), the control signals Sel(1) to Sel(960) are sequentially and exclusively set at the H level. Although omitted in FIG. 5, in the compensation period (D), the control signals /Sel(1) to/Sel (960) are sequentially and exclusively set at the L level in synchronization with control signals Sel(1) to Sel(960).

For example, when the control signal Sel(j) among the control signals Sel(1) to Sel(960) is at the H level, the data signal output circuit 30 outputs the data signals Vd(1) to Vd(6) of the RGB components of a color expressed in a dot that is expressed by the pixel circuit 110 corresponding to an intersection between the scanning line 12 in the i-th row and the data line 14 belonging to the j-th group.

For example, in a period in which the control signal Sel(j) is at the H level, the data signal output circuit 30 outputs, as the data signal Vd(1), the R component (R1) of the dot expressed by the pixel circuit 110R in the i-th row and (6j-5)-th column. For example, the G component (G2) of the dot expressed by the pixel circuit 110G in the i-th row and (6j-4)-th column is output as the data signal Vd(4).

When the control signals Sel(1) to Sel(960) are sequentially and exclusively set at the H level, voltages of the data signals corresponding to respective pixels are retained in the capacitive elements 51 corresponding to the first to 11520-th columns.

FIG. 11 illustrates a state in which the control signal Sel(j) corresponding to the j-th group to which the pixel circuit 110 belongs is at the H level in the compensation period (D) and a voltage Vdata of the data signal Vd(1) is retained in the capacitive element 51.

In the write period (E) in the horizontal scanning period (H), the control signal /Gini is at the H level, the control signal /Gorst is at the H level, the control signal /Drst is at the H level, the control signal Gref is at the L level, and the control signal Gcp is at the H level. Therefore, the transistors 68, 67, and 66 are kept off, the transmission gate 73 is turned off, and the transmission gate 72 is turned on. In the write period (E) of the horizontal scanning period (H) in which the i-th row is selected, the scanning signal /Gwr(i) maintains at the L level, the control signal /Gcmp (i) changes to the H level, and the control signal /Gel(i) maintains at the H level. Therefore, in the pixel circuit 110, the transistor 122 is turned on, and the transistors 123 and 124 are turned off.

Figure 12:
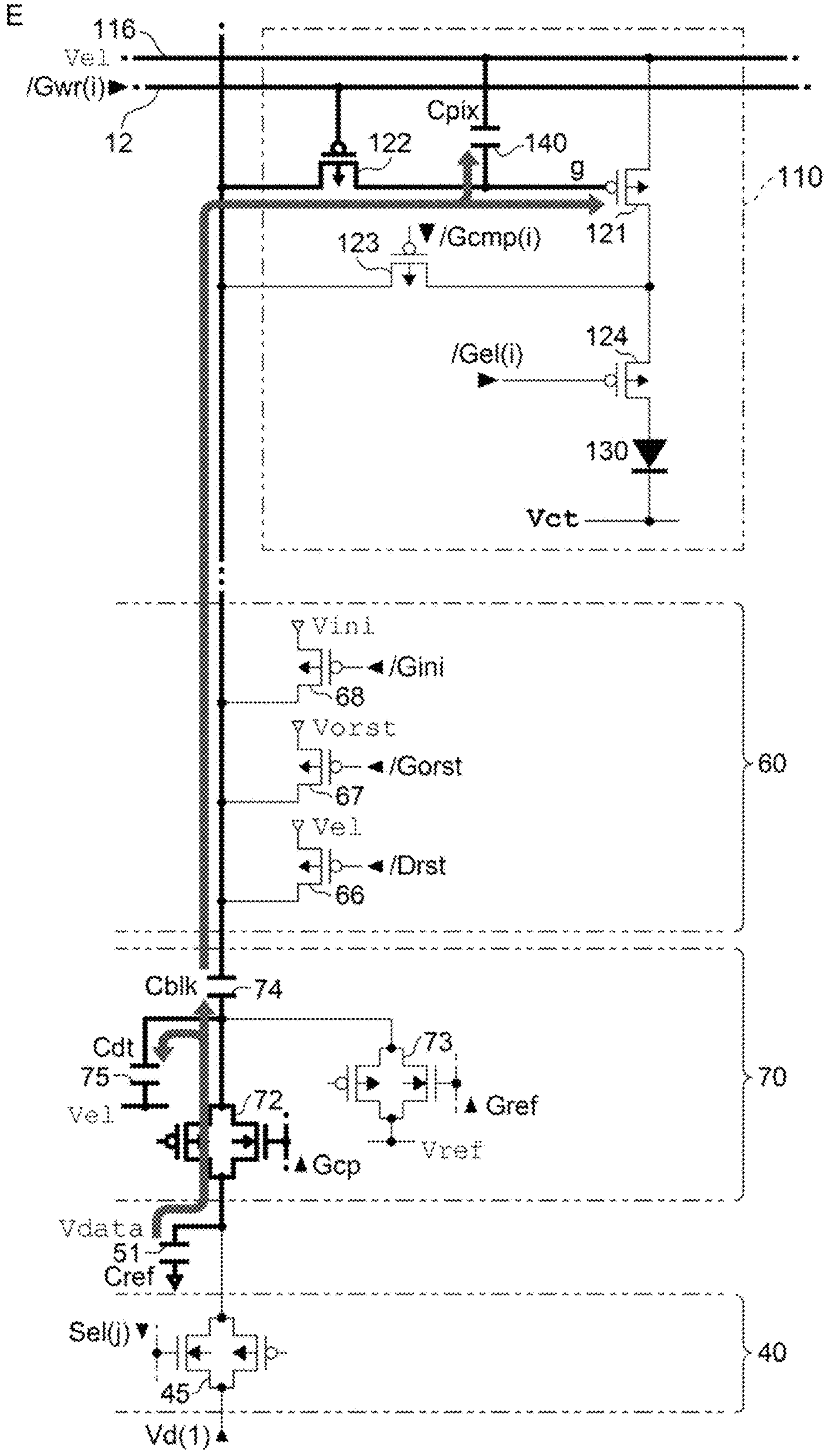
FIG. 12 is a diagram illustrating an operation of the electro-optical device.

Therefore, in the write period (E) of the horizontal scanning period (H) in which the i-th row is selected, as illustrated in FIG. 12, when the transmission gate 73 is turned off and the transmission gate 72 is turned on, one end of the capacitive element 74 changes from the voltage Vref according to the voltage retained in the capacitive element 51. The voltage change propagates to the gate electrode g via the capacitive element 74, the data line 14, and the transistor 122 in order. The voltage of the gate electrode g after the change is retained in the capacitive element 140.

As illustrated in FIG. 12, capacitance of the capacitive element 51 is denoted by Cref, a capacitance size of the capacitive element 74 is denoted by Cblk, a capacitance size of the capacitive element 75 is denoted by Cdt, and a capacitance size of the capacitive element 140 is denoted by Cpix. The voltage of the data signal Vd(1) that is retained in the capacitive element 51 in the compensation period (D) is denoted by Vdata.

A voltage change ΔV of the gate electrode g from the compensation period (D) to the write period (E) is expressed by the following formula (1).

$$\Delta V = \frac{\frac{Cblk(Cdt + Cpix)}{Cblk + Cdt + Cpix} \times Vref + Cref \times Vdata}{\frac{Cblk(Cdt + Cpix)}{Cblk + Cdt + Cpix} \times (Vdata - Vref)} - Vref \tag{1}$$

$$= \frac{Cref}{\frac{Cblk(Cdt + Cpix)}{Cblk + Cdt + Cpix}} \times (Vdata - Vref)$$

$$= Ka \times (Vdata - Vref)$$

That is, as illustrated in the formula (1), the gate electrode g changes to a value obtained by multiplying a voltage change amount (Vdata-Vref) at one end of the capacitive element 74 by a coefficient Ka. The coefficient Ka is a coefficient less than "1" and is determined by the capacitance sizes Cref, Cblk, Cdt, and Cpix. In other words, the capacitance sizes Cref, Cblk, Cdt, and Cpix are designed to be appropriate values, and the coefficient Ka is set to be less than "1". When the coefficient Ka is less than "1", a voltage amplitude from the lowest value to the highest value of the voltage Vdata of the data signal is compressed according to the coefficient Ka and propagates to the gate electrode g.

When the pixel circuit 110 is miniaturized, the current flowing through the OLED 130 may greatly change with respect to a slight change in voltage Vgs between the gate electrode g and the source node s in the transistor 121.

Even in this case, in the embodiment, the voltage amplitude of the voltage Vdata of the data signal is compressed according to the coefficient Ka and propagates to the gate electrode g, and thus the current flowing through the OLED 130 can be accurately controlled.

After the write period (E) ends, the light emission period (F) starts. In the embodiment, from the horizontal scanning period (H) in which the i-th row is selected until the horizontal scanning period (H) in which the i-th row is selected again after a period of one frame (V) elapses, the light emission period (F) of the i-th row occurs, for example, four times, as illustrated in FIG. 7. Specifically, after the horizontal scanning period (H) in which the i-th row is selected, the light emission period (F) in which the control signal /Gel(i) is at the M level occurs four times at substantially equal intervals, and a time length of the period in which the control signal /Gel (i) is at the M level is also set to substantially the same length.

Note that from the horizontal scanning period (H) in which the i-th row is selected until the horizontal scanning period (H) in which the i-th row is selected again after the period of one frame (V) elapses, the light emission period (F) of the i-th row may be continued, that is, the control signal /Gel(i) may be continued at the M level.

Figure 13:
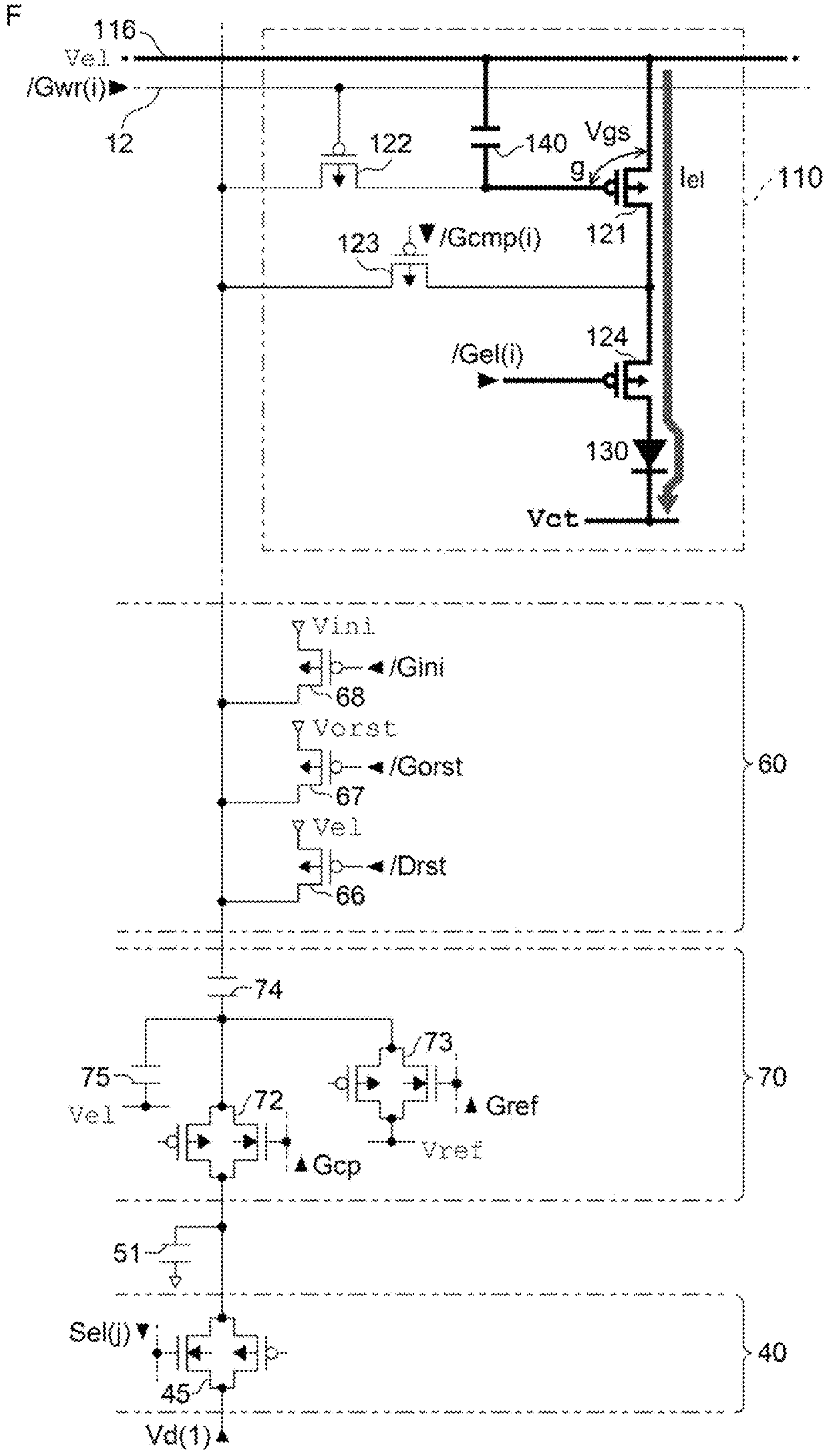
FIG. 13 is a diagram illustrating an operation of the electro-optical device.

When the control signal /Gel(i) is at the M level in the light emission period (F), as illustrated in FIG. 13, the transistor 121 causes a current Iel according to the voltage Vgs to flow through the OLED 130, the current Iel being limited by resistance between the source node and the drain node of the transistor 124. Therefore, the OLED 130 emits light at a luminance according to the current Iel.

Note that in FIGS. 8 to 13, regions in which the capacitive element group 50 and the initialization circuit 60 are provided are not particularly distinguished.

In the embodiment, the amplitude of the voltage Vdata of the data signal output from the data signal output circuit 30 is compressed via the capacitive element 74 and is supplied to the gate electrode g in the pixel circuit 110 as the data signal.

On the other hand, in the compensation period (D), the threshold voltage Vth of the transistor 121 is compensated.

Next, usefulness of the compensation period (D) will be described. In the description of the usefulness, in order to avoid complication of the formula, it is assumed that a compression ratio of the voltage Vdata of the data signal is "1", that is, the voltage Vdata of the data signal is supplied to the data line 14 as it is in the write period (E) after the compensation period (D). It is assumed that in the light emission period (F), not the M level but the L level is applied to the gate electrode of the transistor 124, the transistor 124 is turned on, and the resistance between the source node and the drain node is ideally zero.

First, the current Iel flowing through the OLED 130 in the light emission period (F) can be expressed by the following formula (2).

$$Iel = k_1(Vgs - Vth)^2 \tag{2}$$

A coefficient k1 in the formula (2) is expressed by the following formula (3).

$$k_1 = (W/2L)\cdot\mu Cox \tag{3}$$

In the formula (3), W is a channel width of the transistor 121, L is a channel length of the transistor 121, μ is a mobility of carriers, and Cox is capacitance of a (gate) oxide film per unit area in the transistor 121.

In a configuration in which the voltage Vdata of the data signal is not compressed and the threshold voltage of the transistor 121 is not compensated, when the voltage Vdata of the data signal is directly applied to the gate electrode g of the transistor 121, the voltage Vgs between the gate electrode g and the source node s in the transistor 121 can be expressed as in the following formula (4).

$$Vgs = |Vel - Vdata| \tag{4}$$

At this time, the current Iel flowing through the OLED 130 can be expressed by the following formula (5).

$$\begin{aligned} Iel &= k_1(Vgs - Vth)^2 \\ &= k_1(Vel - Vdata - Vth)^2 \end{aligned} \tag{5}$$

As represented by the formula (5), the current Iel is affected by the threshold voltage Vth. Here, due to a semiconductor process, a variation in threshold voltage Vth in the transistor 121 is in a range of several mV to several tens of mV. When the threshold voltage Vth in the transistor 121 varies in a range of several mV to several tens of mV, the current Iel may cause a difference of 40% at the maximum between the adjacent pixel circuits 110.

Current-luminance characteristics of the OLED 130 are substantially linear. Therefore, in the configuration in which the threshold voltage Vth is not compensated, even when data signals of the same voltage Vdata are supplied to the two pixel circuits 110 in order to cause two OLEDs 130 to emit light with the same luminance, the currents actually flowing through the OLEDs 130 are different. Therefore, in the configuration in which the threshold voltage Vth is not compensated, the luminance varies, and the display quality is greatly impaired.

In the compensation period (D), when the gate electrode g in the transistor 121 is converged to approach the voltage (Vel−Vth) and then is changed to the voltage Vdata, the voltage Vgs between the gate electrode g and the source node s in the transistor 121 can be expressed as the following formula (6).

$$Vgs = Vth - k_2(Vdata - Vref) \tag{6}$$

A coefficient k2 in the formula (6) is a coefficient determined by the capacitance sizes Cblk and Cpix in a configuration in which the voltage Vdata of the data signal is not compressed (a configuration in which the capacitive element 74 is not provided).

When the voltage Vgs is expressed as in the formula (6), the current Iel flowing through the OLED 130 can be expressed as in the following formula (7).

$$\begin{aligned} Iel &= k_1\{Vth - k_2(Vdata - Vref) - Vth\}^2 \\ &= k_1k_2(Vref - Vdata)^2 \end{aligned} \tag{7}$$

In the formula (7), a term of the threshold voltage Vth is removed, and the current Iel is determined by the voltage Vdata of the data signal. Accordingly, deterioration in display quality due to the threshold voltage Vth of the transistor 121 can be prevented.

In the embodiment, actually, as illustrated in the formula (1), the voltage amplitude from the lowest value to the highest value of the voltage Vdata of the data signal is compressed according to the coefficient Ka and propagates to the gate electrode g.

In the embodiment, the M level is supplied to the gate electrode of the transistor 124 in the light emission period (F), and the current Iel is limited, but there is no change in that the deterioration in display quality due to the threshold voltage Vth can be prevented.

Next, the usefulness of applying the M level to the gate electrode of the transistor 124 in the light emission period (F) in the embodiment will be described.

The reason for applying the M level to the gate electrode of the transistor 124 is to maintain the constant current characteristic of the transistor 121 regardless of the aging of the current-voltage characteristics of the OLED 130 by operating the transistor 124 in the saturation region.

Specifically, when the current Iel flows, the OLED 130 emits light at a luminance according to the current Iel. In the embodiment, in the pixel circuit 110, the voltage of the gate electrode g in the transistor 121 is retained by the capacitive element 140, and thus the constant current characteristic of the current Iel flowing from the interconnect 116 to the OLED 130 can be secured.

However, in the OLED 130, element characteristics change with the elapse of the light emission time, and a potential of the anode (pixel electrode 131) necessary for passing a constant current gradually increases. When the potential of the anode of the OLED 130 increases, an equilibrium point of the potential in a path from the interconnect 116 to the common electrode 133 changes, and a potential of the source node of the transistor 124, that is, the drain node d of the transistor 121 increases. When the potential of the drain node d of the transistor 121 increases, the voltage between the source node s and the drain node d in the transistor 121 also fluctuates, and the current flowing through the drain node of the transistor 121 also fluctuates, and as a result, the constant current characteristic of the OLED 130 is impaired.

Therefore, in the embodiment, the transistor 124 is operated in the saturation region as a countermeasure against the loss of the constant current characteristic due to aging of the element characteristics of the OLED 130.

When the transistor 124 is operated in the saturation region, even when the potential of the anode of the OLED 130 changes, the transistor 124 is directly affected by the change. The transistor 121 is affected by the potential fluctuation at the drain e of the transistor 124, but the fluctuation of the drain current in the saturation region is small. Therefore, the influence of the potential fluctuation of the drain node in the transistor 121 coupled to the transistor 124 and the potential fluctuation of the gate electrode due to the current leakage is alleviated.

In the arrangement illustrated in FIG. 4, the size of the pixel circuits 110 excluding the light emitting elements in the X direction is ½ times the size of the light emitting elements in the X direction, which can become a bottleneck when attempting to achieve a narrower pitch, miniaturization, and higher definition in the pixel circuits 110.

Therefore, in the electro-optical device 10 according to the embodiment, the structure of the pixel circuit 110 that solves this point will be described.

Figure 14:
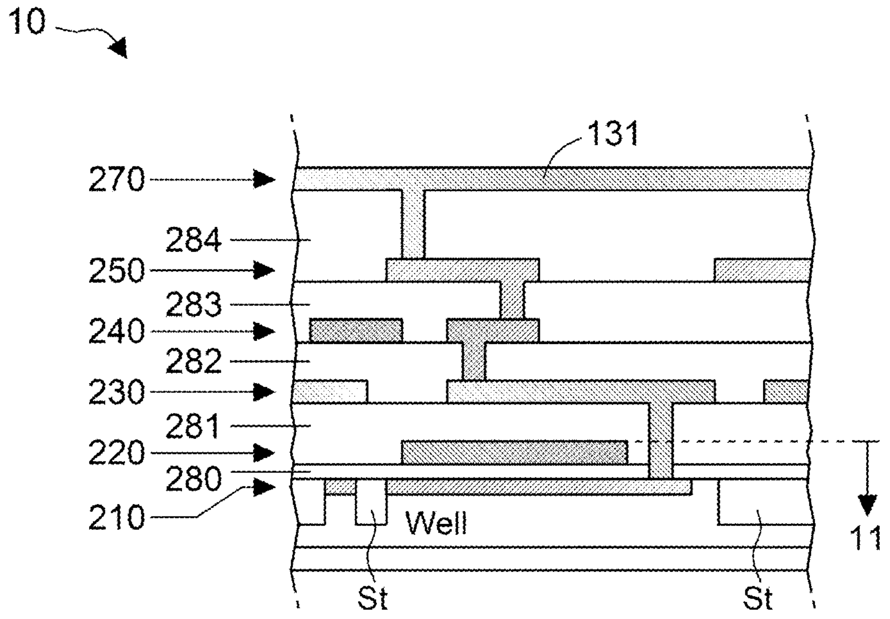
FIG. 14 is a cross-sectional view of the main part of the electro-optical device.

FIG. 14 is a cross-sectional view of a main part of the electro-optical device 10, and is a diagram illustrating a stacked structure of interconnects and transistors. FIG. 14 is a diagram simply illustrating interconnect layers of the electro-optical device 10, and is not a cutaway view of a specific portion of the electro-optical device 10.

In the semiconductor substrate forming the electro-optical device 10, layers used as conductive layers are a semiconductor layer 210, a gate electrode layer 220, a first interconnect layer 230, a second interconnect layer 240, a third interconnect layer 250, and a pixel electrode layer 270 in order in the Z direction as illustrated in FIG. 14.

For example, aluminum or an alloy containing aluminum is used as the first interconnect layer 230, the second interconnect layer 240, and the third interconnect layer 250. The pixel electrode layer 270 is a laminate of a metal layer having reflectivity and a conductive wire layer having transmissivity and conductivity. As the metal layer having reflectivity, for example, aluminum or an alloy containing aluminum is used, and as the conductive wire layer having transmissivity and conductivity, for example, indium tin oxide is used.

Ordinal numbers (first, second, and third) of the interconnect layers in the detailed description of the disclosure indicate an order of film formation in the semiconductor substrate, whereas the ordinal numbers of the interconnect layers in the claims are used to distinguish the interconnect layers. Therefore, the ordinal numbers of the interconnect layers in the detailed description of the disclosure do not necessarily match the ordinal numbers of the interconnect layers in the claims.

In the semiconductor layer 210, for example, an interconnect, a semiconductor region, or the like is provided by implanting impurity ions into a p-well region Well. A gate insulating film 280 is provided between the semiconductor layer 210 and the gate electrode layer 220 in the Z direction. Note that a trench St is provided to separate the semiconductor region.

By patterning the gate electrode layer 220, gate electrodes of the transistors 121 to 124 and an electrode serving as the other end of the capacitive element 140 are provided. An electrode or the like of the semiconductor layer 210 and an electrode of the gate electrode layer 220 are electrically coupled by a contact hole formed in the gate insulating film 280.

In the semiconductor substrate, the transistors 121 to 124 function as elements up to the gate electrode layer 220 in the Z direction. Therefore, as illustrated in FIG. 14, in the electro-optical device 10, a portion up to the gate electrode layer 220 may be referred to as a substrate 11 for the sake of convenience. A thickness direction of the substrate 11 is the Z direction (or a direction opposite to the Z direction).

In the first interconnect layer 230, the second interconnect layer 240, and the third interconnect layer 250, interconnects, electrodes, and the like are provided by patterning each layer. The pixel electrode 131 is provided by patterning the pixel electrode layer 270.

A first interlayer insulating film 281 is provided between the gate electrode layer 220 and the first interconnect layer 230. The electrode in the gate electrode layer 220 and the interconnect in the first interconnect layer 230 are electrically coupled to each other by a contact hole formed in the first interlayer insulating film 281.

A second interlayer insulating film 282 is provided between the first interconnect layer 230 and the second interconnect layer 240. The interconnect or the like in the first interconnect layer 230 and the interconnect or like in the second interconnect layer 240 are electrically coupled to each other by a contact hole formed in the second interlayer insulating film 282.

A third interlayer insulating film 283 is provided between the second interconnect layer 240 and the third interconnect layer 250. The interconnect or the like in the second interconnect layer 240 and the interconnect or the like in the third interconnect layer 250 are electrically coupled to each other by a contact hole formed in the third interlayer insulating film 283.

A fourth interlayer insulating film 284 is provided between the third interconnect layer 250 and the pixel electrode layer 270. The interconnect or the like in the third interconnect layer 250 and the pixel electrode 131 in the pixel electrode layer 270 are electrically coupled to each other by a contact hole formed in the fourth interlayer insulating film 284.

FIGS. 15 to 19 are plan views illustrating a specific interconnect structure in the electro-optical device 10.

Figure 15:
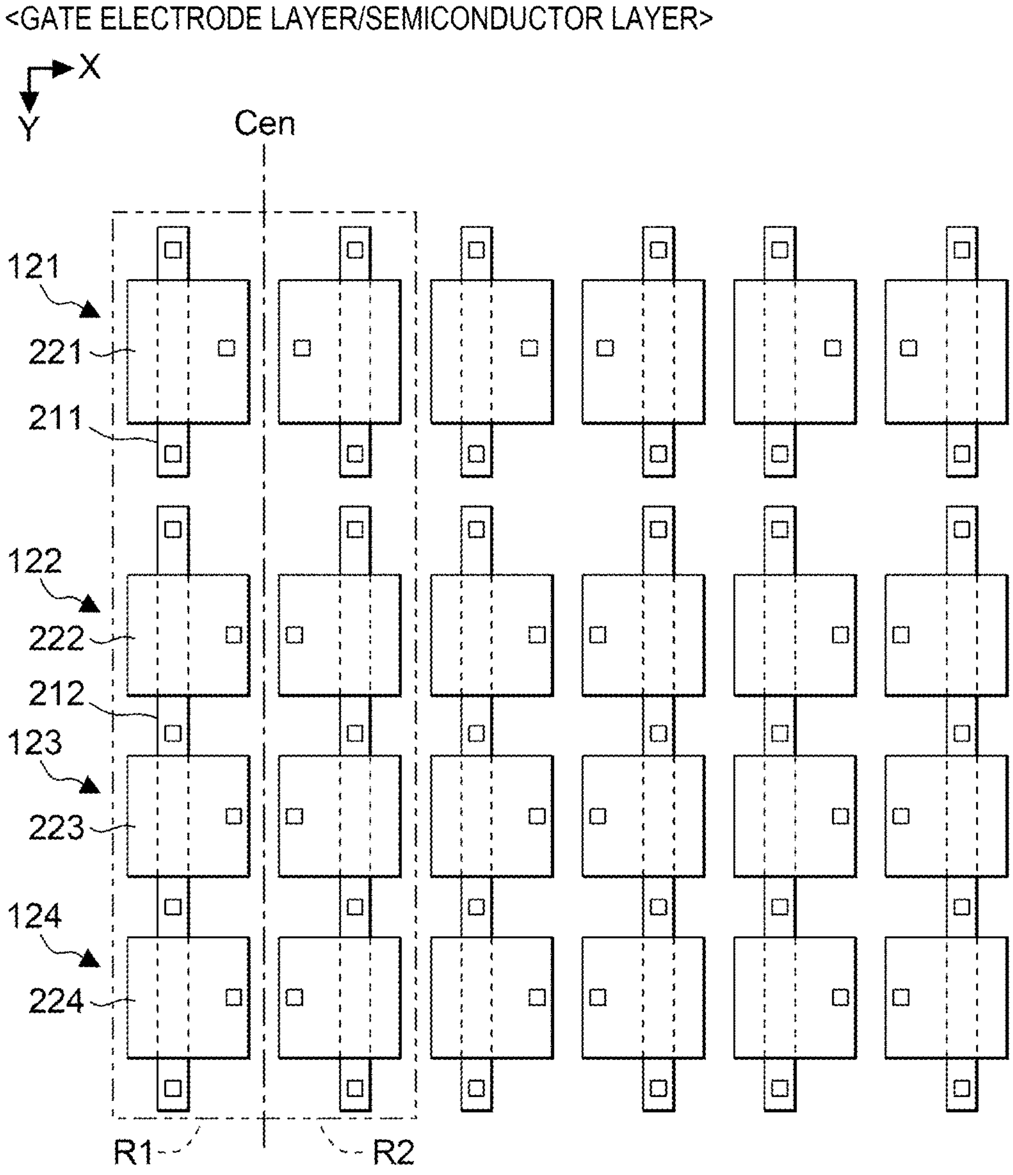
FIG. 15 is a plan view illustrating a semiconductor region and the like of the electro-optical device.
Figure 16:
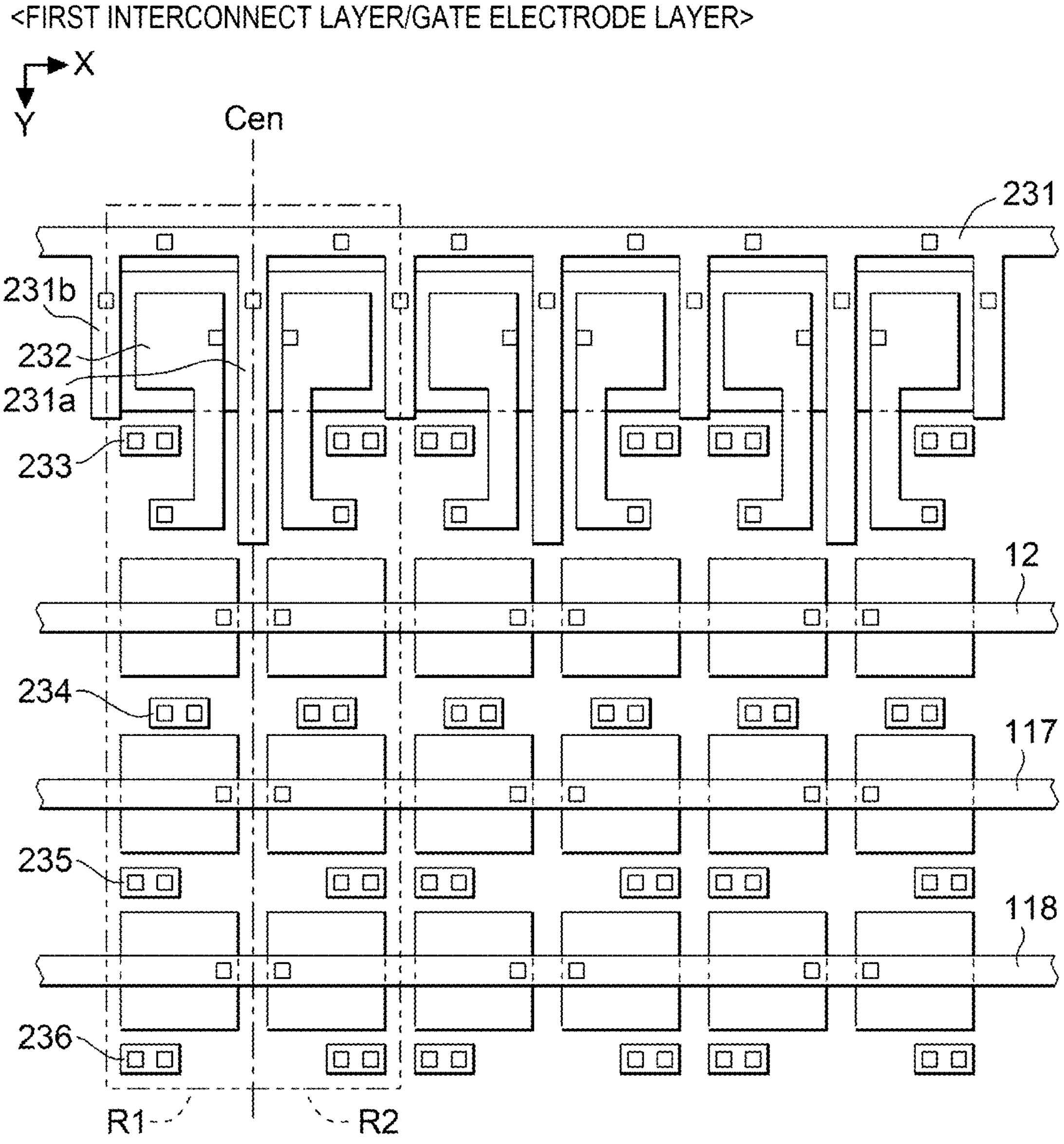
FIG. 16 is a plan view illustrating interconnects and the like in a first interconnect layer of the electro-optical device.
Figure 17:
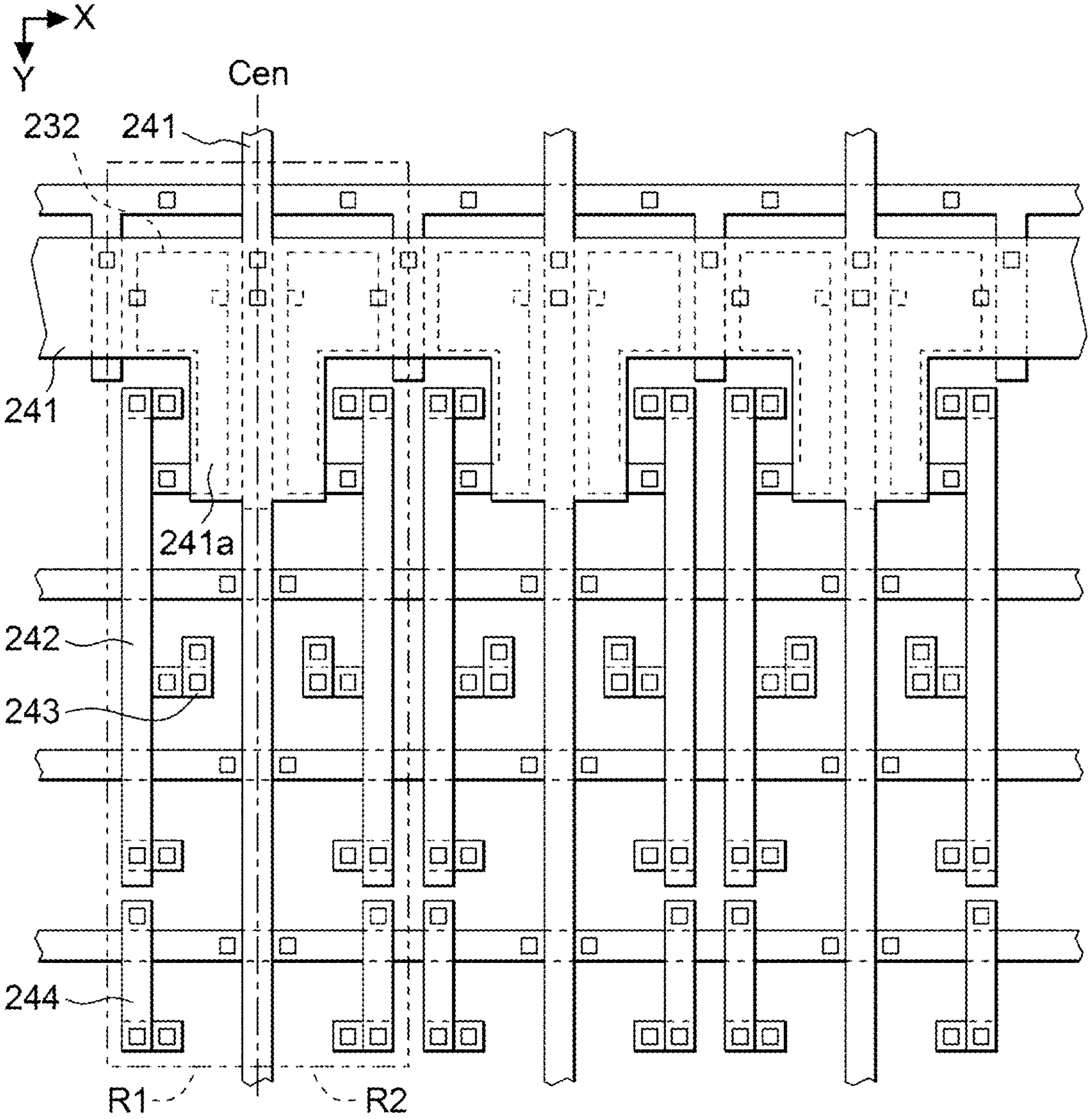
FIG. 17 is a plan view illustrating interconnects and the like in a second interconnect layer of the electro-optical device.
Figure 18:
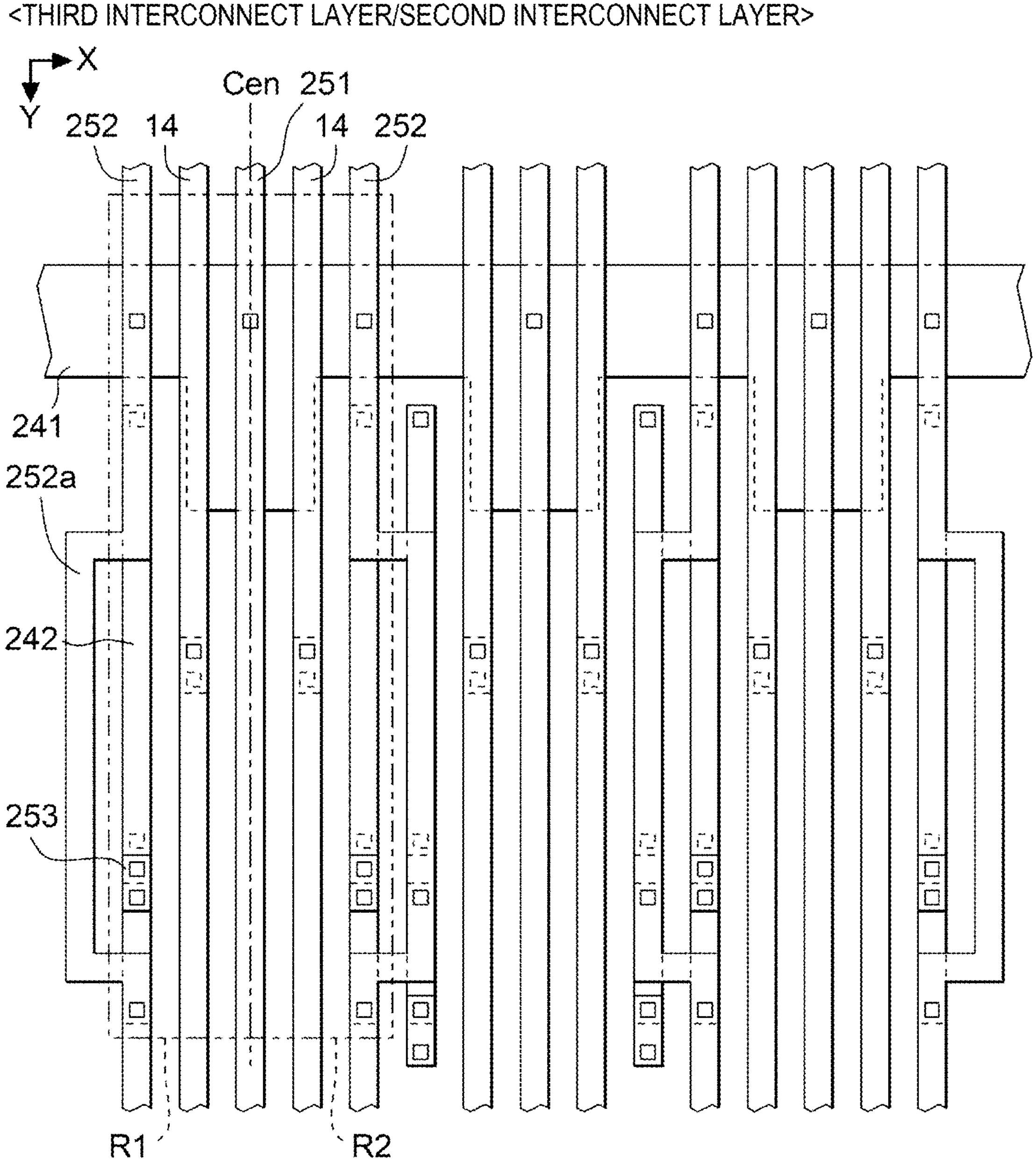
FIG. 18 is a plan view illustrating interconnects and the like in a third interconnect layer of the electro-optical device.
Figure 19:
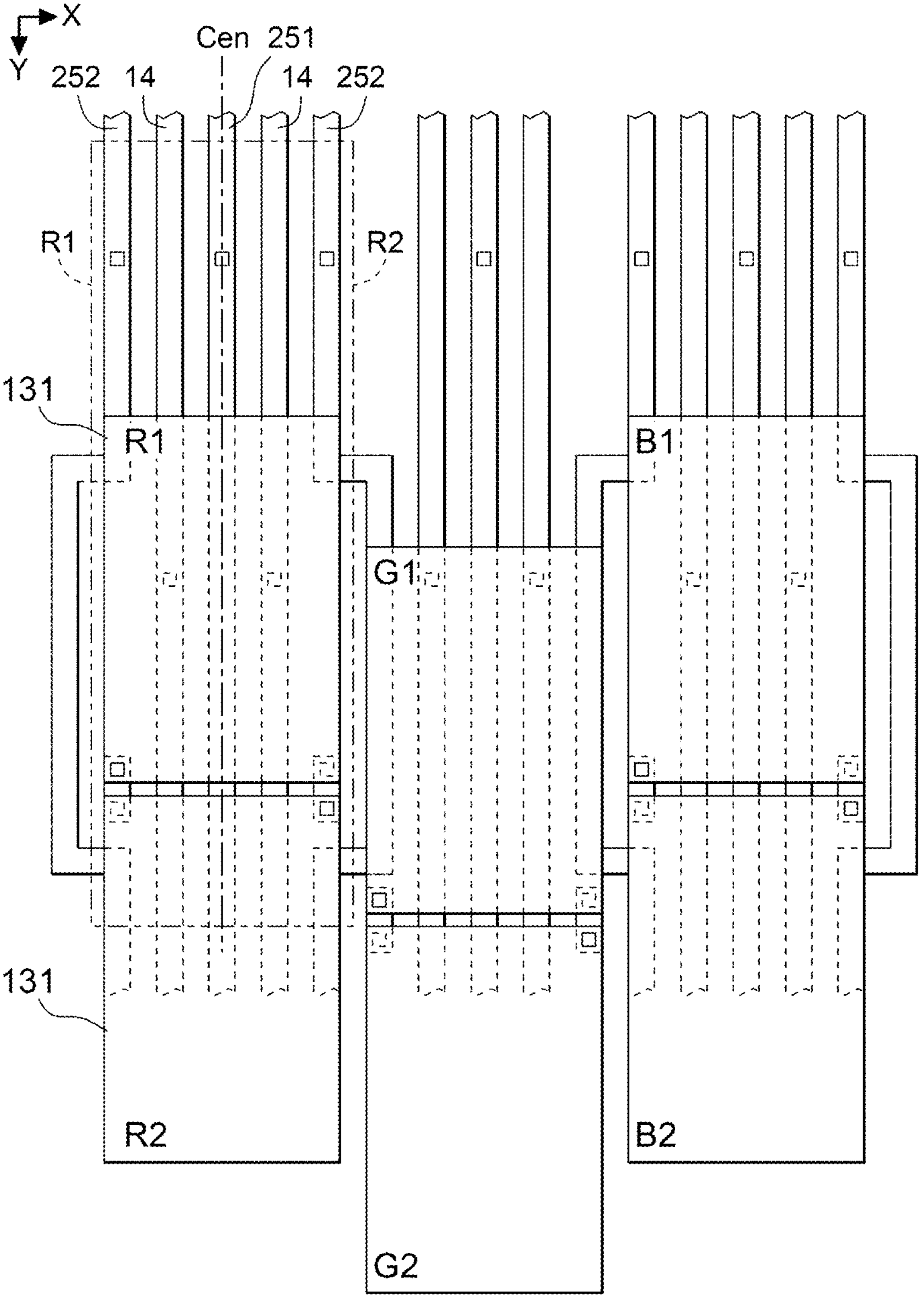
FIG. 19 is a plan view illustrating pixel electrodes of the electro-optical device.
Figure 20:
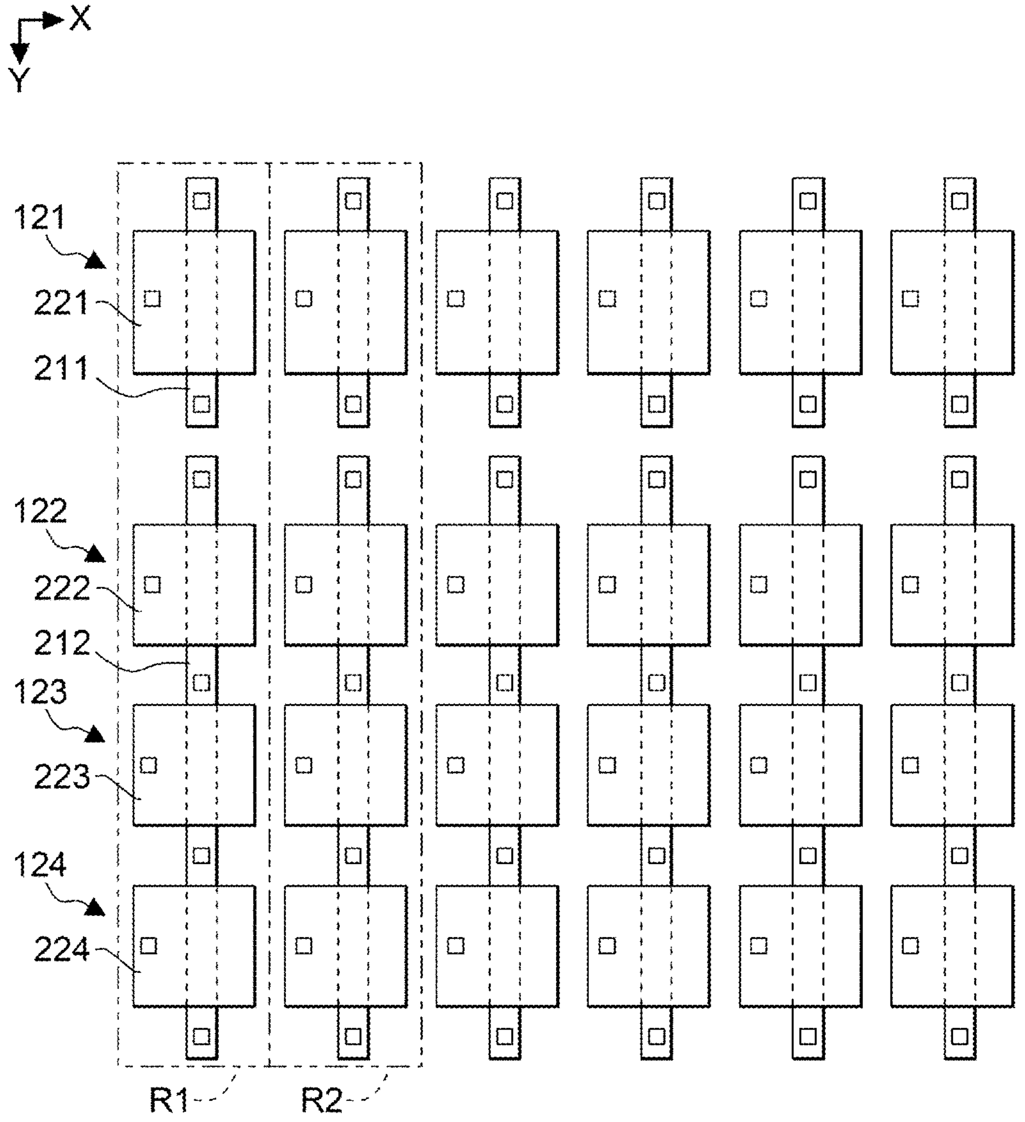
FIG. 20 is a plan view illustrating a semiconductor region and the like in a comparative example.
Figure 21:
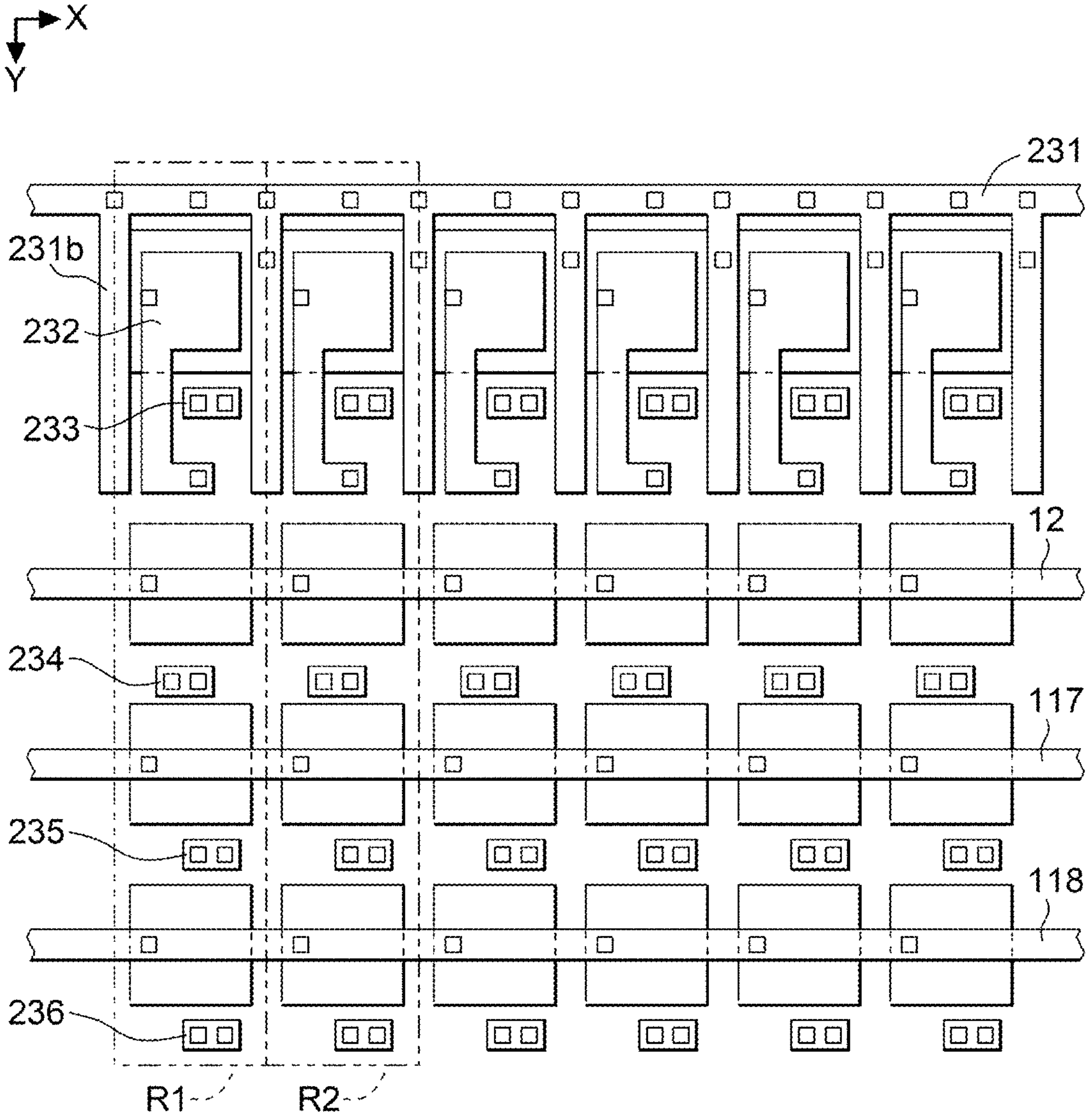
FIG. 21 is a plan view illustrating interconnects and the like in the first interconnect layer in the comparative example.
Figure 22:
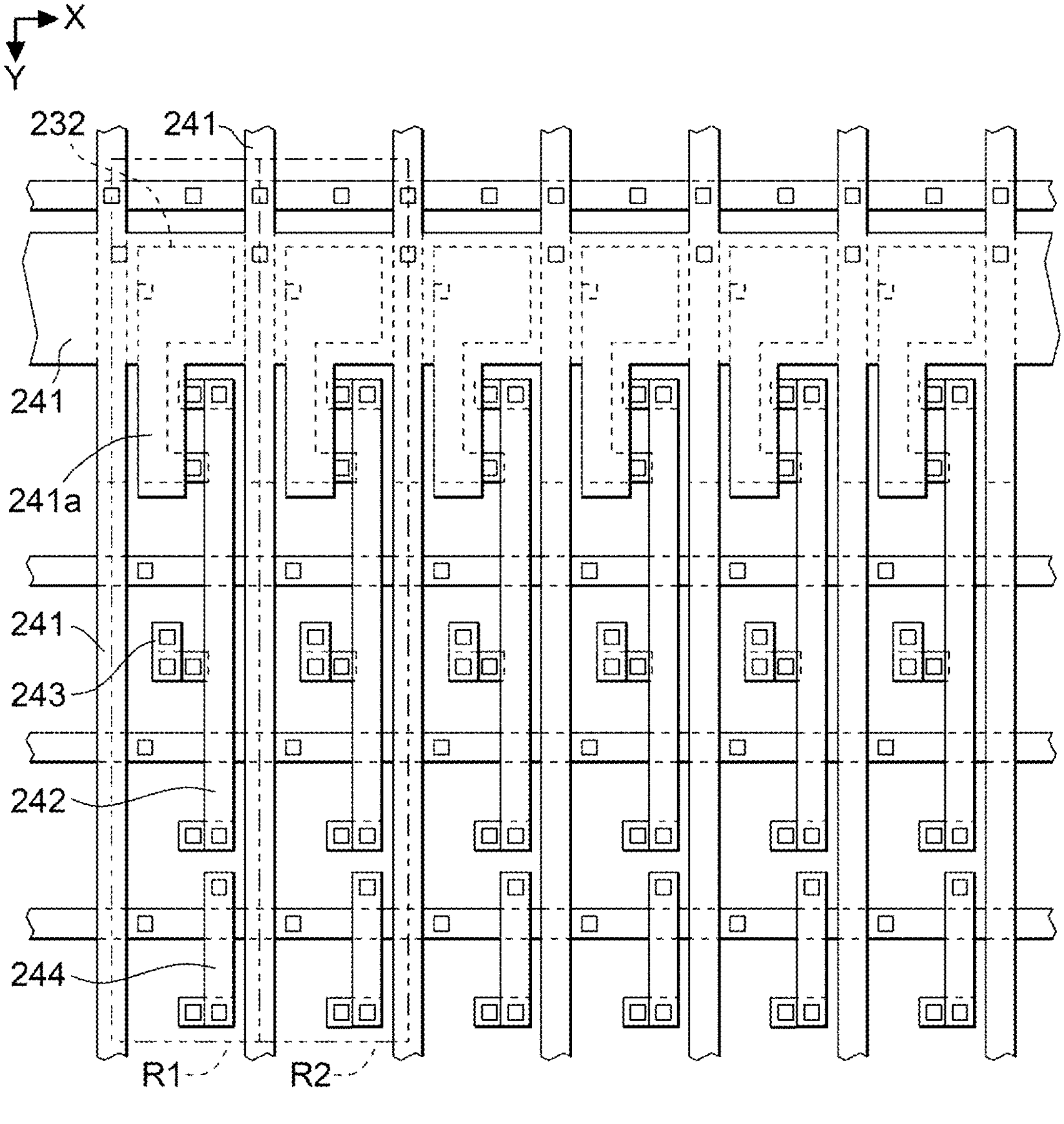
FIG. 22 is a plan view illustrating interconnects and the like in the second interconnect layer in the comparative example.

Specifically, FIG. 15 is a plan view illustrating a transistor region, an interconnect, and the like formed in the semiconductor layer 210, and the electrode and the like formed by patterning the gate electrode layer 220. FIG. 16 is a plan view illustrating the interconnect and the like formed by patterning the first interconnect layer 230. FIG. 17 is a plan view illustrating the interconnect and the like formed by patterning the second interconnect layer 240. FIG. 18 is a plan view illustrating the interconnect and the like formed by patterning the third interconnect layer 250. FIG. 19 is a plan view illustrating the pixel electrode 131 formed by patterning the pixel electrode layer 270.

In FIGS. 15 to 19, a small-diameter square frame indicates a position of the contact hole.

As for the name of each unit, the . . . layer is a layer that collectively refers to a conductive layer after film formation and before patterning, or an interconnect, an electrode, or the like having the same conductive layer before patterning. The . . . line, the . . . electrode, and the . . . relay member are formed by patterning the . . . layer, and include the scanning line 12, the data line 14, and the control lines 117 and 118.

In FIG. 15, a region 211 is a semiconductor region of the transistor 121, and is formed by, for example, implanting impurity ions into a p-well region Well in a semiconductor substrate. A region 212 is a semiconductor region common to the transistors 122 to 124, and is formed by implanting impurity ions, similar to the region 211.

An electrode 221 is a gate electrode of the transistor 121. In the drawing, a region where the electrode 221 and the region 211 overlap in plan view is a channel region of the transistor 121.

Similarly, an electrode 222 is a gate electrode of the transistor 122. A region where the electrode 222 and the region 212 overlap in plan view is a channel region of the transistor 122. An electrode 223 is a gate electrode of the transistor 123. A region where the electrode 223 and the region 212 overlap in plan view is a channel region of the transistor 123. An electrode 224 is a gate electrode of the transistor 124. A region where the electrode 224 and the region 212 overlap in plan view is a channel region of the transistor 124.

As illustrated in FIG. 15, for two adjacent pixel circuits of the same color along the X direction, the transistors 121 to 124 and the electrodes 221 to 224 within the two pixel circuits excluding the light emitting elements are symmetrically disposed on the left and right with respect to a line Cen that partitions the two pixel circuits in plan view.

In the present description, the plan view indicates a case where the electro-optical device 10 is viewed from a direction opposite to the Z direction.

As illustrated in FIG. 16, an interconnect 231, the scanning line 12, the control lines 117 and 118, and interconnects 232 to 237 are provided by patterning the first interconnect layer 230.

The interconnect 231, the scanning line 12, and the control lines 117 and 118 each extend in the X direction, and are provided in 540 rows according to the arrangement of the pixel circuits 110 excluding the light emitting elements. In other words, the interconnect 231, the scanning line 12, and the control lines 117 and 118 are each commonly provided in the pixel circuits 110 in one row (11,520 pixel circuits 110).

The voltage Vel is directly or indirectly applied to the interconnect 231. Therefore, in order to reduce the interconnect resistance, the interconnect 231 is not only wider in the Y direction than the scanning line 12 and the control lines 117 and 118 which also extend in the X direction, but is also coupled to, via contact holes, interconnects provided by patterning the other second interconnect layer 240 and third interconnect layer 250, as described below.

The interconnect 232 is a relay interconnect for guiding the drain node of the transistor 122 to the gate node of the transistor 121.

In addition to a portion extending in the X direction, the interconnect 231 includes portions 231*a* and 231*b* that protrude in the Y direction and sandwich the interconnect 232 on the left and right so as to include a boundary between the pixel circuits adjacent to each other in the X direction. Specifically, the portion 231*a* is provided to include the line Cen that partitions the two adjacent pixel circuits of the same color along the X direction, and the portion 231*b* is provided to include a partition line between two adjacent pixel circuits of different colors along the X direction.

Therefore, three sides of the interconnect 232 coupled to the gate node of the transistor 121 are shielded by the interconnect 231 including the portions 231*a* and 231*b* in the same first interconnect layer 230.

The interconnect 233 is a relay interconnect for guiding the drain node of the transistor 121 to the source node of the transistor 123 and the source node of the transistor 124.

The interconnect 234 is a relay interconnect for guiding the source node of the transistor 121 to the data line 14.

The interconnect 235 is a relay interconnect for guiding an interconnect 242 of the second interconnect layer 240 described next to the source node of the transistor 123 and the source node of the transistor 124.

An interconnect 236 is a relay interconnect for guiding the drain node of the transistor 124 to the pixel electrode 131 which is the anode of the OLED 130.

As illustrated in FIG. 16, for two adjacent pixel circuits of the same color along the X direction, the interconnects 232 to 236 within the two pixel circuits excluding the light emitting elements are symmetrically disposed on the left and right with respect to the line Cen in plan view.

As illustrated in FIG. 17, interconnects 241 to 244 are provided by patterning the second interconnect layer 240.

The interconnect 241 includes a wide portion extending in the X direction and a portion extending in the Y direction so as to include the line Cen in plan view. The voltage Vel is directly or indirectly applied to the interconnect 241, and is coupled to the interconnect 231 via a contact hole.

A portion 241*a* of the interconnect 241 extending in the Y direction is wide and covers the interconnect 232 in plan view. Therefore, the interconnect 232 coupled to the gate node of the transistor 121 is shielded in three directions by the interconnect 231 in the same layer and by the portion 241*a* in the upper layer.

The interconnect 242 is a relay interconnect for guiding the interconnect 233 to the source node of the transistor 123 and the source node of the transistor 124.

Therefore, the drain node of the transistor 121 is coupled to the source node of the transistor 123 and the source node of the transistor 124 via the interconnects 233, 242, and 235 in order.

The interconnect 243 is a relay interconnect for guiding the interconnect 234 to the data line 14.

The interconnect 244 is a relay interconnect for guiding the interconnect 236 to the pixel electrode 131.

As illustrated in FIG. 17, for two adjacent pixel circuits of the same color along the X direction, the interconnects 241 to 243 within the two pixel circuits excluding the light emitting elements are symmetrically disposed on the left and right with respect to the line Cen in plan view.

As illustrated in FIG. 18, interconnects 251, 252, and 253 and the data line 14 are provided by patterning the third interconnect layer 250.

The interconnect 251 is provided to include the line Cen in plan view, and the data line 14 is provided to extend in the Y direction in parallel to the interconnect 251.

The interconnect 252 is provided substantially parallel to the data line 14, and includes a portion 252*a* bent so as to avoid the interconnect 253. Both the interconnects 251 and 252 are coupled to the interconnect 241 on the lower layer via a contact hole. Therefore, the voltage Vel is applied to both the interconnects 251 and 252.

The interconnect 253 is a relay interconnect for guiding the interconnect 244 to the pixel electrode 131.

The data line 14 is coupled to the source node of the transistor 122 and the drain node of the transistor 123 via the interconnects 243 and 234 in order.

The data line 14 is sandwiched between the interconnects 251 and 252 to which the voltage Vel is applied. Therefore, the data line 14 is shielded by the interconnects 251 and 252 in the same layer.

As illustrated in FIG. 18, for two adjacent pixel circuits of the same color along the X direction, the interconnects 251 and 252 and the data line 14 within the two pixel circuits excluding the light emitting elements are symmetrically disposed on the left and right with respect to the line Cen in plan view.

As illustrated in FIG. 19, the pixel electrode 131 is provided by patterning the pixel electrode layer 270. The pixel electrode 131 is coupled to the drain node of the transistor 124 via the interconnects 253, 244, and 236 in order.

As illustrated in FIG. 19, for two adjacent pixel circuits of the same color along the X direction, the interconnects 251 to 253 within the two pixel circuits excluding the light emitting elements are symmetrically disposed on the left and right with respect to the line Cen in plan view. The pixel electrode 131 is provided at a shift position in the Y direction in plan view with respect to a position of the corresponding pixel circuit (excluding the light emitting element).

In order to describe the superiority of the electro-optical device 10 according to the embodiment, an electro-optical device according to a comparative example will be described. FIGS. 20 to 24 are plan views illustrating a specific interconnect structure in the comparative example, and correspond to FIGS. 15 to 19 illustrating the embodiment in order.

As illustrated in these drawings, in the comparative example, pixel circuits of the same color adjacent to each other in the X direction are disposed in the same manner, not symmetrically about the line Cen as in the embodiment.

Figure 23:
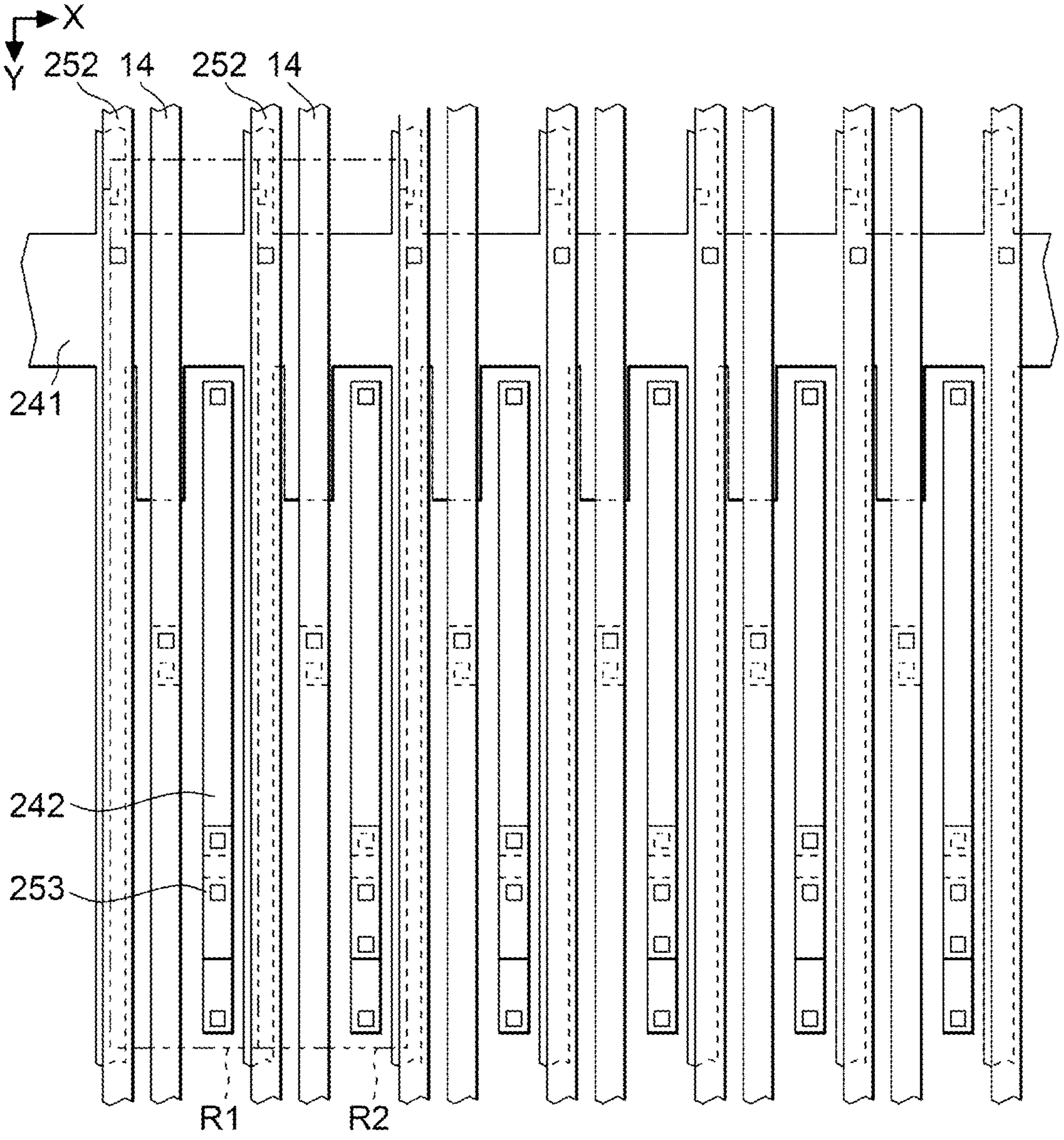
FIG. 23 is a plan view illustrating interconnects and the like in the third interconnect layer in the comparative example.
Figure 24:
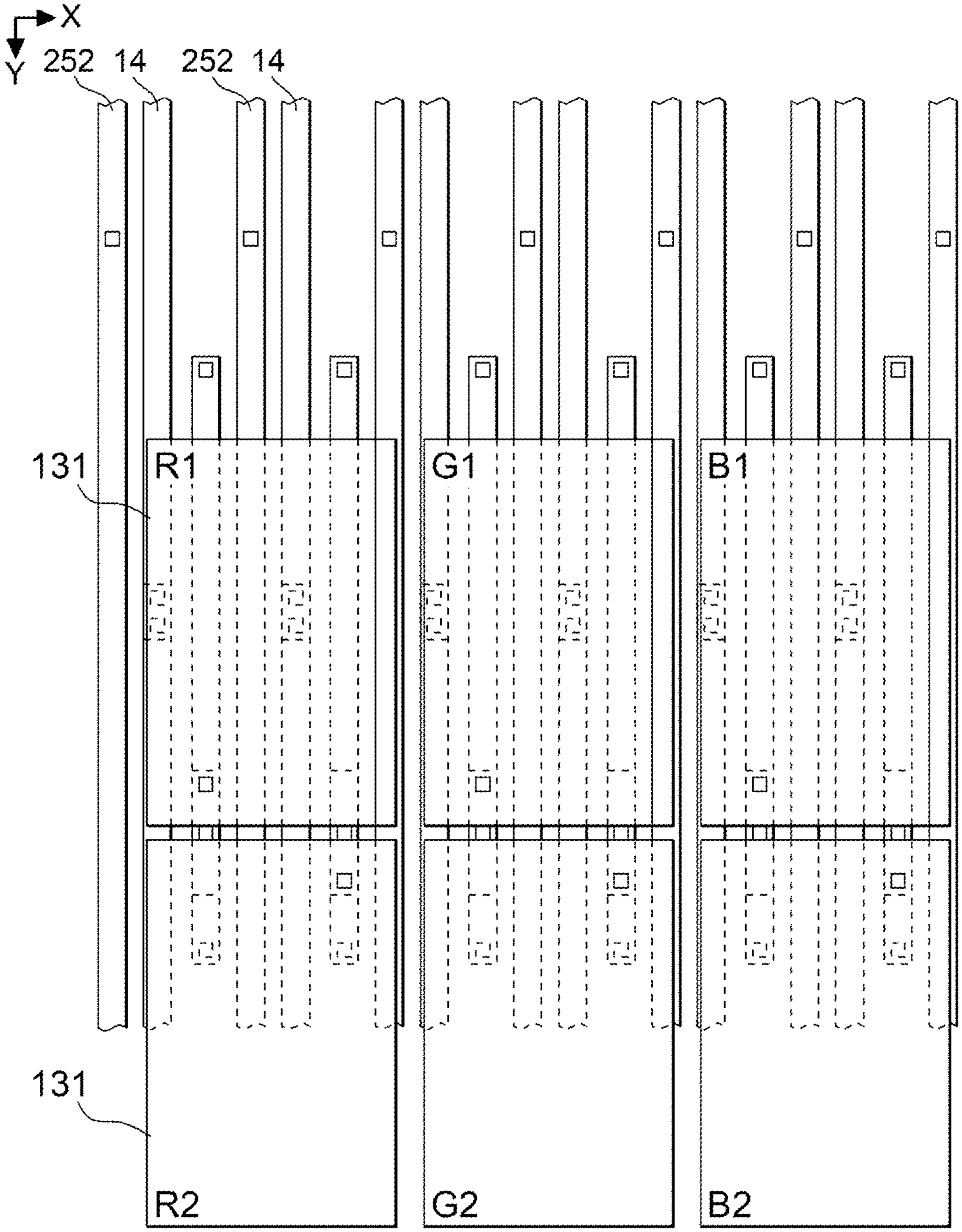
FIG. 24 is a plan view illustrating pixel electrodes in the comparative example.

In the comparative example, in one column of the pixel circuit 110, as interconnects in the same interconnect layer that extend along the Y direction, for example, as illustrated in FIG. 23 and FIG. 24, a total of three interconnects, that is, the data line 14, the interconnect 251 for applying the voltage Vel, and the relay interconnect 253 in the third interconnect layer are required, and for two columns of the pixel circuits adjacent to each other in the X direction, six interconnects are required.

On the other hand, in the embodiment, the interconnect 251 for applying the voltage Vel is provided to include the line Cen in plan view, and is also used in the pixel circuits of the same color adjacent to each other in the X direction. Therefore, in the embodiment, for two columns of the pixel circuits of the same color adjacent to each other in the X direction, a total of five interconnects, that is, two data lines 14, one shared interconnect 251, and two interconnects 253 are sufficient.

In other words, for each column, three interconnects are required in the comparative example, whereas only 2.5 interconnects are required in the embodiment.

Therefore, in the embodiment, the number of interconnects provided along the Y direction can be reduced in the display region 100 in which the pixel circuits 110 are arranged, and thus a narrower pitch, miniaturization, and higher definition in the pixel circuit 110 can be easily achieved.

In the embodiment, a so-called stripe arrangement in which the OLEDs 130, which are light emitting elements of the same color, are arranged in the Y direction has been described as an example, but the present disclosure is not limited thereto as long as the pixel circuits excluding the light emitting elements are symmetrically arranged on the left and right with respect to the line Cen.

For example, the present disclosure can also be applied to a so-called stripe arrangement in which light emitting elements are arranged in a 2×2 matrix, with two green lights arranged on one diagonal and red and blue lights arranged on the remaining diagonal.

In the embodiment, the OLED 130 has been described as an example of the light emitting element, but other light emitting elements may be used. For example, an LED, a mini LED, a micro LED, or the like may be used as the light emitting element.

Channel types of the transistors 121, 122, 123, and 124 are not limited to the embodiment and the like. These transistors may be appropriately replaced with a transmission gate except for the transistor 121.

The transmission gates 45, 72, and 73 may be replaced with a single-channel transistor.

Next, an electronic instrument to which the electro-optical device 10 according to the embodiment and the like is applied will be described. The electro-optical device 10 is suitable for applications in which pixels are small and high-definition display is performed. Therefore, a head-mounted display will be described as an example of the electronic instrument.

Figure 25:
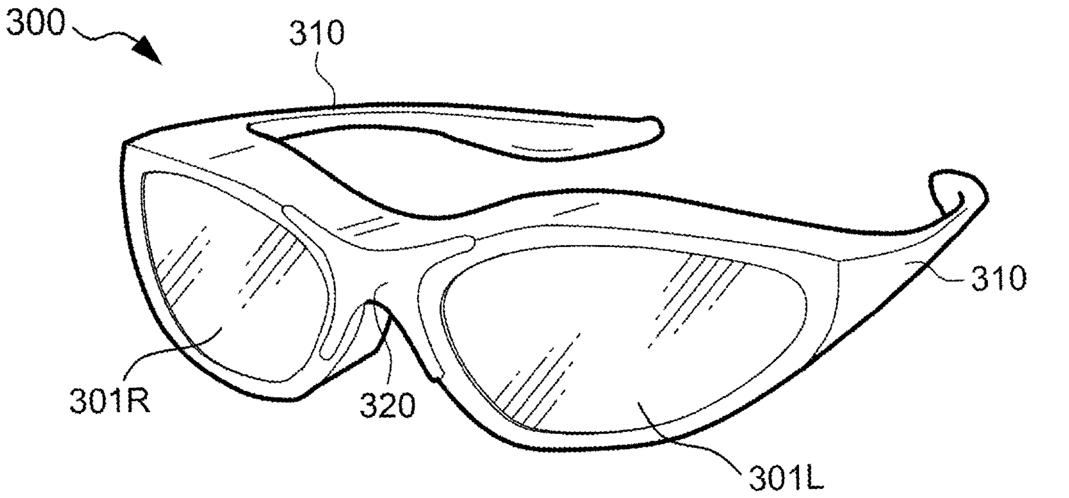
FIG. 25 is a perspective view illustrating a head-mounted display using the electro-optical device.
Figure 26:
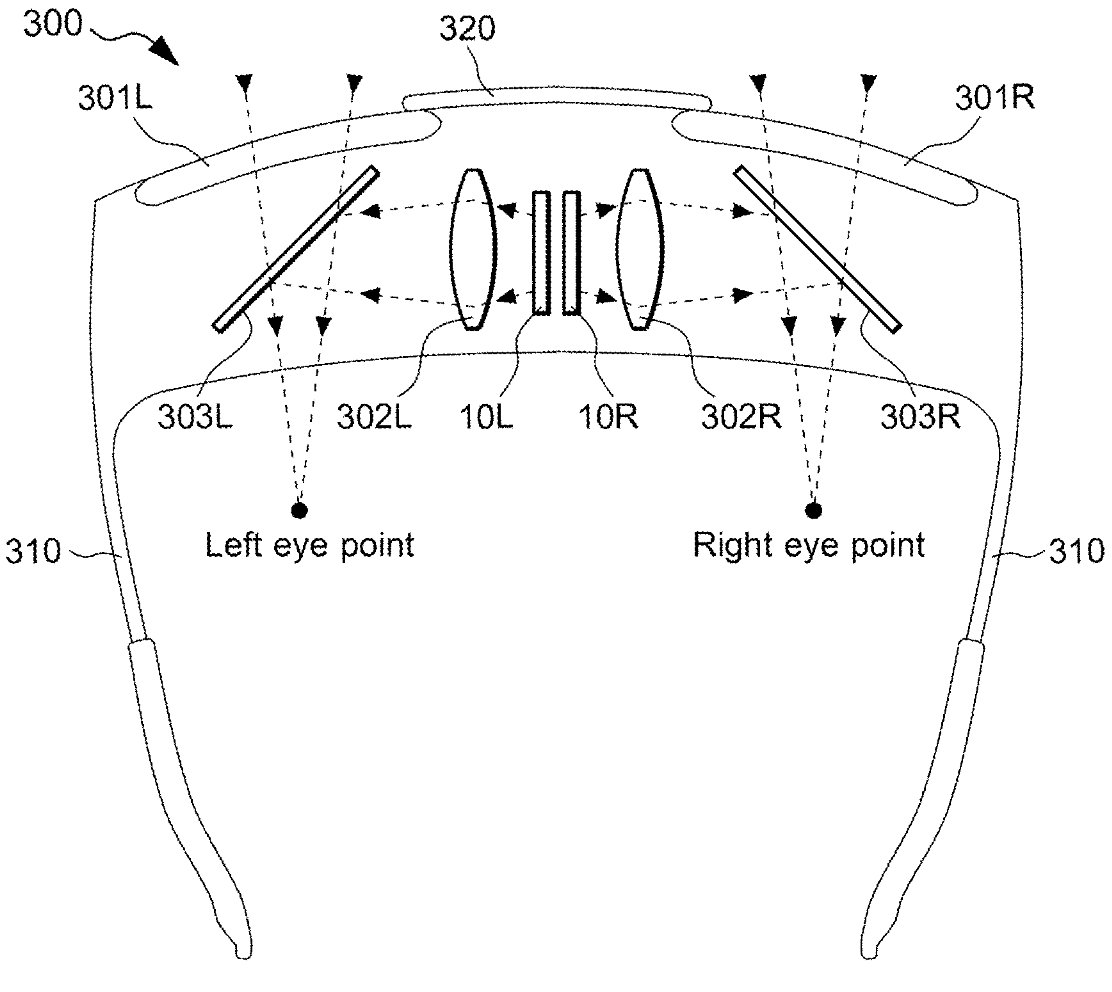
FIG. 26 is a diagram illustrating an optical configuration of the head-mounted display.

FIG. 25 is a diagram illustrating an appearance of a head-mounted display, and FIG. 26 is a diagram illustrating an optical configuration of the head-mounted display.

First, as illustrated in FIG. 25, a head-mounted display 300 includes temples 310, a bridge 320, and lenses 301L and 301R as in general glasses in appearance. As illustrated in FIG. 26, the head-mounted display 300 includes an electro-optical device 10L for a left eye and an electro-optical device 10R for a right eye that are provided near the bridge 320 and on a rear side of the lenses 301L and 301R (lower side in the drawing).

An image display surface of the electro-optical device 10L is disposed on the left in FIG. 26. Accordingly, a display image from the electro-optical device 10L is emitted in a direction of 9 o'clock in the drawing via an optical lens 302L. A half mirror 303L reflects a display image from the electro-optical device 10L in a direction of 6 o'clock, and transmits light entering from a direction of 12 o'clock. An image display surface of the electro-optical device 10R is disposed on the right opposite to the electro-optical device 10L. Accordingly, a display image from the electro-optical device 10R is emitted in a direction of 3 o'clock in the drawing via an optical lens 302R. A half mirror 303R reflects a display image from the electro-optical device 10R in a direction of 6 o'clock, and transmits light entering from a direction of 12 o'clock.

In this configuration, a wearer of the head-mounted display 300 can observe display images from the electro-optical devices 10L and 10R in a see-through state superimposed over the external scenery.

In the head-mounted display 300, when the electro-optical device 10L displays an image for the left eye and the electro-optical device 10R displays an image for the right eye among binocular images with parallax, the wearer can perceive the displayed image as if the displayed image had a depth or a stereoscopic effect.

The electronic instrument including the electro-optical device 10 can be used not only as the head-mounted display 300, but also as an electronic viewfinder in a video camera and an interchangeable-lens digital camera, a portable information terminal, a display unit in wristwatches, and a light valve in a projection projector.

From the above description, for example, preferred aspects of the present disclosure are understood as follows.

An electro-optical device according to Aspect 1 of the present disclosure includes: a first light emitting element including a first anode; a first data line configured to supply a first data signal to the first light emitting element; a second light emitting element including a second anode; a second data line configured to supply a second data signal to the second light emitting element; a first transistor circuit configured to control light emission of the first light emitting element; a second transistor circuit configured to control light emission of the second light emitting element; and a first shield interconnect. The first transistor circuit includes a first anode line electrically coupled to the first anode, the second transistor circuit includes a second anode line electrically coupled to the second anode, the first shield interconnect is disposed between the first data line and the second data line in plan view and extends along a first direction, the first data line and the second data line are symmetrical with respect to the first shield interconnect in plan view, the first anode line and the second anode line are symmetrical with respect to the first shield interconnect in plan view, and a power supply for the first transistor circuit and the second transistor circuit is supplied to the first shield interconnect.

In the electro-optical device according to Aspect 1, the first shield interconnect is disposed between the first data line and the second data line, and thus interference occurring between the first data line and the second data line can be prevented.

Since the first shield interconnect commonly supplies the power supply to the first transistor circuit and the second transistor circuit, and thus the interconnect can be reduced as compared with a configuration in which power supply is individually supplied. Therefore, a pitch of the data lines can be easily narrowed.

Note that the OLED 130 in the pixel circuit 110 located to the left of the line Cen is an example of the "first light emitting element," and the pixel electrode 131 which is the anode of the OLED 130 is an example of the "first anode." The pixel circuit 110 without the OLED 130 is an example of the "first transistor circuit". In the pixel circuit 110, a path extending from a drain node of the transistor 124 through the interconnects 236, 244, and 253 to the pixel electrode 131 is an example of the "first anode line". The data line 14 provided corresponding to the pixel circuit 110 is an example of the "first data line".

The Y direction is an example of the "first direction", and the interconnect 251 is an example of the "first shield interconnect".

Note that the OLED 130 in the pixel circuit 110 located to the right of the line Cen is an example of the "second light emitting element", and the pixel electrode which is the anode of the OLED 130 is an example of the "second anode". The pixel circuit 110 without the OLED 130 is an example of the "second transistor circuit". In the pixel circuit 110, a path extending from the drain node of the transistor 124 through the interconnects 236, 244, and 253 to the pixel electrode 131 is an example of the "second anode line". The data line 14 provided corresponding to the pixel circuit 110 is an example of the "second data line".

The voltage Vel is an example of the "power supply".

In the electro-optical device according to specific Aspect 2 of Aspect 1, the first light emitting element and the second light emitting element are adjacent to each other along the first direction.

In the electro-optical device according to Aspect 2, the first transistor circuit and the second transistor circuit are disposed symmetrically with respect to the first shield interconnect along the first direction, but the first light emitting element and the second light emitting element are disposed along the first direction, and thus the size of the first and second light emitting elements in a direction orthogonal to the first direction can be twice the size of the first and second transistor circuits in the orthogonal direction.

The electro-optical device according to another specific Aspect 3 of Aspect 1 further includes a second shield interconnect; and a third shield interconnect, in which the first data line is disposed between the first shield interconnect and the second shield interconnect in plan view, and the second data line is disposed between the first shield interconnect and the third shield interconnect in plan view.

In the electro-optical device according to Aspect 3, in plan view, the first data line is shielded by the first shield interconnect and the second shield interconnect, and the second data line is shielded by the first shield interconnect and the third shield interconnect. The interconnect 252 corresponding to the pixel circuit 110 located to the left of the line Cen is an example of the "second shield interconnect", and the interconnect 252 corresponding to the pixel circuit 110 located to the right is an example of the "third shield interconnect".

In the electro-optical device according to specific Aspect 4 of Aspect 3, the power supply is supplied to the second shield interconnect and the third shield interconnect.

The electro-optical device according to another specific Aspect 5 of Aspect 1 further includes a scanning line, in which the first transistor circuit includes a first transistor that is turned on or off according to a voltage of the scanning line, and a second transistor that supplies a current according to the first data signal to the first light emitting element when the first transistor is turned on, and the second transistor circuit includes a third transistor that is turned on or off according to a voltage of the scanning line, and a fourth transistor that supplies a current according to the second data signal to the second light emitting element when the third transistor is turned on.

In the electro-optical device according to Aspect 5, the scanning line can be shared by the first transistor circuit and the second transistor circuit.

The transistor 122 in the pixel circuit 110 located to the left of the line Cen is an example of the "first transistor", and the transistor 121 is an example of the "second transistor". The transistor 122 in the pixel circuit 110 located to the right of the line Cen is an example of the "third transistor", and the transistor 121 is an example of the "fourth transistor".

An electronic instrument according to Aspect 6 includes the electro-optical device according to any one of Aspects 1 to 5.

What is claimed is:

1. An electro-optical device comprising:

a first light emitting element including a first anode;

a first data line configured to supply a first data signal to the first light emitting element;

a second light emitting element including a second anode;

a second data line configured to supply a second data signal to the second light emitting element;

a first transistor circuit configured to control light emission of the first light emitting element;

a second transistor circuit configured to control light emission of the second light emitting element; and a first shield interconnect, wherein the first transistor circuit includes a first anode line electrically coupled to the first anode, the second transistor circuit includes a second anode line electrically coupled to the second anode, the first shield interconnect is disposed between the first data line and the second data line in plan view and extends along a first direction, the first data line and the second data line are symmetrical with respect to the first shield interconnect in plan view, the first anode line and the second anode line are symmetrical with respect to the first shield interconnect in plan view, and a power supply for the first transistor circuit and the second transistor circuit is supplied to the first shield interconnect.

2. The electro-optical device according to claim 1, wherein the first light emitting element and the second light emitting element are adjacent to each other along the first direction.

3. The electro-optical device according to claim 1, further comprising:

a second shield interconnect; and a third shield interconnect, wherein the first data line is disposed between the first shield interconnect and the second shield interconnect in plan view, and the second data line is disposed between the first shield interconnect and the third shield interconnect in plan view.

4. The electro-optical device according to claim 3, wherein the power supply is supplied to the second shield interconnect and the third shield interconnect.

5. The electro-optical device according to claim 1, further comprising:

a scanning line, wherein the first transistor circuit includes a first transistor that is turned on or off according to a voltage of the scanning line, and a second transistor that supplies a current according to the first data signal to the first light emitting element when the first transistor is turned on, and the second transistor circuit includes a third transistor that is turned on or off according to a voltage of the scanning line, and a fourth transistor that supplies a current according to the second data signal to the second light emitting element when the third transistor is turned on.

6. An electronic instrument comprising:

the electro-optical device according to claim 1.

* * * * *